United States Patent
Marr

(10) Patent No.: US 11,055,526 B2
(45) Date of Patent: Jul. 6, 2021

(54) METHOD, SYSTEM AND APPARATUS FOR PROCESSING A PAGE OF A DOCUMENT

(71) Applicant: CANON KABUSHIKI KAISHA, Tokyo (JP)

(72) Inventor: Gregory John Marr, Hillsborough (AU)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 16/220,587

(22) Filed: Dec. 14, 2018

(65) Prior Publication Data

US 2019/0188466 A1 Jun. 20, 2019

(51) Int. Cl.
| | |
|---|---|
| *G06K 9/00* | (2006.01) |
| *G06F 40/137* | (2020.01) |
| *G06F 40/151* | (2020.01) |
| *G06F 40/166* | (2020.01) |
| *G10L 13/02* | (2013.01) |

(52) U.S. Cl.
CPC ....... *G06K 9/00463* (2013.01); *G06F 40/137* (2020.01); *G06F 40/151* (2020.01); *G06F 40/166* (2020.01); *G06K 9/00456* (2013.01); *G06K 9/00469* (2013.01); *G10L 13/02* (2013.01)

(58) Field of Classification Search
CPC ............ G06K 9/00463; G06K 9/00456; G06F 40/137; G06F 40/166; G06F 40/151; G10L 13/02
See application file for complete search history.

(56) References Cited

U.S. PATENT DOCUMENTS

| | | | | |
|---|---|---|---|---|
| 5,848,184 A | * | 12/1998 | Taylor | G06K 9/00463 382/173 |
| 6,151,426 A | * | 11/2000 | Lee | H04N 1/3872 382/319 |

(Continued)

OTHER PUBLICATIONS

Laven, K., et al., "A Statistical Learning Approach to Document Image Analysis", Proceedings, Eighth International Conference on Document Analysis and Recognition, Aug. 2005, pp. 357-361, 1.

(Continued)

*Primary Examiner* — Stephen S Hong
*Assistant Examiner* — Broderick C Anderson
(74) *Attorney, Agent, or Firm* — Canon U.S.A., Inc., IP Division

(57) ABSTRACT

A method of processing a page of a document. A plurality of commands describing graphical objects of the page configured to be reproduced in a first presentation mode are received, the plurality of commands indicating a type of each of the graphical objects, an enclosing region and a drawing order associated with each of the graphical objects. An object significance score is determined for each of the graphical objects using the respective object type and object depth. A significance profile for the page is determined by combining the determined object significance scores according to a page layout, the page layout being determined using the enclosing regions associated with the graphical objects. Logical structure elements of the page are determined using the significance profile. The plurality of commands are processed according to the determined logical structure elements for generating the page of the document in a second presentation mode.

12 Claims, 21 Drawing Sheets

(56) References Cited

U.S. PATENT DOCUMENTS

| | | | | |
|---|---|---|---|---|
| 8,368,705 | B2* | 2/2013 | Green | G06T 15/005 |
| | | | | 345/522 |
| 8,910,032 | B2* | 12/2014 | Graves | G11B 27/034 |
| | | | | 715/201 |
| 9,063,911 | B2 | 6/2015 | Levy et al. | |
| 2002/0007367 | A1* | 1/2002 | Narahara | G06F 40/221 |
| | | | | 715/234 |
| 2007/0130514 | A1* | 6/2007 | Matthee | G06F 40/186 |
| | | | | 715/210 |
| 2009/0254345 | A1* | 10/2009 | Fleizach | G10L 13/00 |
| | | | | 704/260 |
| 2010/0021069 | A1* | 1/2010 | Fan | G06T 5/001 |
| | | | | 382/224 |
| 2015/0067476 | A1* | 3/2015 | Song | G06F 16/285 |
| | | | | 715/234 |
| 2016/0217592 | A1* | 7/2016 | Croxford | G06T 1/20 |

OTHER PUBLICATIONS

Malerba, D., et al., "Machine Learning for Reading Order Detection in Document Image Understanding", In Machine Learning in Document Analysis and Recognition; 2008; pp. 45-69.

* cited by examiner

Heading

Volume 1, Issue 1                                         30 June 2017

Subheading 1

Paragraph text paragraph text paragraph text paragraph text paragraph text paragraph text paragraph text paragraph text paragraph text paragraph text paragraph text paragraph text paragraph text paragraph text.

Paragraph text paragraph text paragraph text paragraph text paragraph text paragraph text paragraph text paragraph text paragraph text paragraph text paragraph text paragraph text paragraph text paragraph text.

Paragraph text paragraph text paragraph text paragraph text paragraph text paragraph text paragraph text paragraph text paragraph text paragraph text paragraph text paragraph text paragraph text paragraph text.

Paragraph text paragraph text paragraph text paragraph text paragraph text paragraph text paragraph text paragraph text paragraph text paragraph text paragraph text paragraph text paragraph text paragraph text.

Subheading 2

Paragraph text paragraph text paragraph text paragraph text paragraph text paragraph text paragraph text paragraph text paragraph text paragraph text paragraph text paragraph text paragraph text paragraph text.

Paragraph text paragraph text paragraph text paragraph text paragraph text paragraph text paragraph text paragraph text paragraph text paragraph text paragraph text paragraph text paragraph text paragraph text.

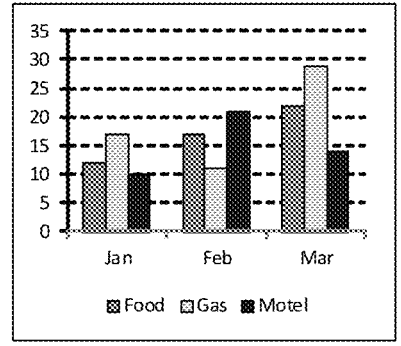

*Figure Caption*

Fig. 5A

METHOD, SYSTEM AND APPARATUS FOR PROCESSING A PAGE OF A DOCUMENT

REFERENCE TO RELATED PATENT APPLICATION

This application claims the benefit under 35 U.S.C. § 119 of the filing date of Australian Patent Application No. 2017279613, filed Dec. 19, 2017, hereby incorporated by reference in its entirety as if fully set forth herein.

TECHNICAL FIELD

This invention relates to the field of electronic document analysis and, in particular, the generation of logical structure from graphical content to enable a document to be generated. The present invention also relates to a method, system and apparatus for processing a page of a document, and to a computer program product including a computer readable medium having recorded thereon a computer program for processing a page of a document.

BACKGROUND

A page description language (PDL), such as ISO 32000 Portable Document Format (PDF), defines a binary format for electronic documents. Typically, PDLs describe a document in terms of the graphical content for each page. The graphical content is usually described using a sequence of graphic commands, which reference a set of resources such as images and fonts. Some graphic commands modify a graphics state, whereas some graphic commands result in the generation of a graphical object. A graphical object is described using parameters to a graphic command, and the graphic state at the point in which the graphic command is invoked. As such, a page in an electronic document can be considered as a sequence of graphical objects, where each graphical object is described in terms of shape, geometric transformation, colour, and an operation that describes how the graphical object is combined with a background of the object.

Some PDLs facilitate the description of non-visual content, such as the logical structure of a document. The logical structure of a document describes a hierarchy in which a person would normally read the document in order to understand the document content in the way the author intended. For example, a heading may be followed by several paragraphs, which together constitutes a logical section of the document.

This logical structure is useful in many applications, such as text-to-speech conversion where the content must be converted to sounds in the correct order, or document editing where some graphical content may need to be reflowed when inserting new content or deleting old content.

Not all electronic document producers include logical structure information in electronic documents. Furthermore, the sequence of the graphical objects does not necessarily correspond with the logical sequence, and so deducing the logical structure from the graphical objects is a non-trivial problem.

One method of determining the logical structure for a document from the visual graphics is to first render each page of the document, forming an image of each page. There are various methods of analysing the page images to identify regions of interest. However, the downside to determining the logical structure for a document from the visual graphics is that rendering the pages is a computationally expensive task. Furthermore, it can be difficult to separate the background and foreground elements of the page once rendering has been performed, and text recognition and optical character recognition (OCR) can be unreliable.

Another method of determining the logical structure for a document is to use machine learning to identify regions of interest on a page, and the sequence of the regions. However, determining the logical structure for a document is to use machine learning requires a large set of training data, including the expected logical structure for each document.

SUMMARY

It is an object of the present invention to substantially overcome, or at least ameliorate, one or more disadvantages of existing arrangements.

According to one aspect of the present disclosure, there is provided a method of processing a page of a document, the method comprising:
  receiving a plurality of commands describing graphical objects of the page configured to be reproduced in a first presentation mode, the plurality of commands indicating a type of each of the graphical objects, an enclosing region and a drawing order associated with each of the graphical objects;
  determining an object significance score for each of the graphical objects using the respective object type and object depth;
  determining a significance profile for the page by combining the determined object significance scores according to a page layout, the page layout being determined using the enclosing regions associated with the graphical objects;
  determining logical structure elements of the page using the significance profile; and
  processing the plurality of commands according to the determined logical structure elements for generating the page of the document in a second presentation mode.

According to another aspect of the present disclosure, there is provided an apparatus for processing a page of a document, the apparatus comprising:
  means for receiving a plurality of commands describing graphical objects of the page configured to be reproduced in a first presentation mode, the plurality of commands indicating a type of each of the graphical objects, an enclosing region and a drawing order associated with each of the graphical objects;
  means for determining an object significance score for each of the graphical objects using the respective object type and object depth;
  means for determining a significance profile by combining the determined object significance scores according to a page layout, the page layout being determined using the enclosing regions associated with the graphical objects;
  means for determining logical structure elements of the page using the significance profile; and
  means for processing the plurality of commands according to the determined logical structure elements for generating the page of the document in a second presentation mode.

According to still another aspect of the present disclosure, there is provided a system for processing a page of a document, the system comprising:

a memory for storing data and a computer program;

a processor coupled to the memory for executing the computer program, the computer program having instructions for:

receiving a plurality of commands describing graphical objects of the page configured to be reproduced in a first presentation mode, the plurality of commands indicating a type of each of the graphical objects, an enclosing region and a drawing order associated with each of the graphical objects;

determining an object significance score for each of the graphical objects using the respective object type and object depth;

determining a significance profile by combining the determined object significance scores according to a page layout, the page layout being determined using the enclosing regions associated with the graphical objects;

determining logical structure elements of the page using the significance profile; and processing the plurality of commands according to the determined logical structure elements for generating the page of the document in a second presentation mode.

According to still another aspect of the present disclosure, there is provided a non-transitory computer readable medium having a program stored on the medium for processing a page of a document, the program comprising:

code for receiving a plurality of commands describing graphical objects of the page configured to be reproduced in a first presentation mode, the plurality of commands indicating a type of each of the graphical objects, an enclosing region and a drawing order associated with each of the graphical objects;

code for determining an object significance score for each of the graphical objects using the respective object type and object depth;

code for determining a significance profile by combining the determined object significance scores according to a page layout, the page layout being determined using the enclosing regions associated with the graphical objects;

code for determining logical structure elements of the page using the significance profile; and code for processing the plurality of commands according to the determined logical structure elements for generating the page of the document in a second presentation mode.

Other aspects are also disclosed.

BRIEF DESCRIPTION OF THE DRAWINGS

One or more embodiments of the invention will now be described with reference to the following drawings, in which:

FIGS. 5A, 5B, 5C and 5D are diagrams of an example of a page of an electronic document, showing a sequence of horizontal and vertical cuts according to the empty space;

DETAILED DESCRIPTION INCLUDING BEST MODE

Figure 1A:
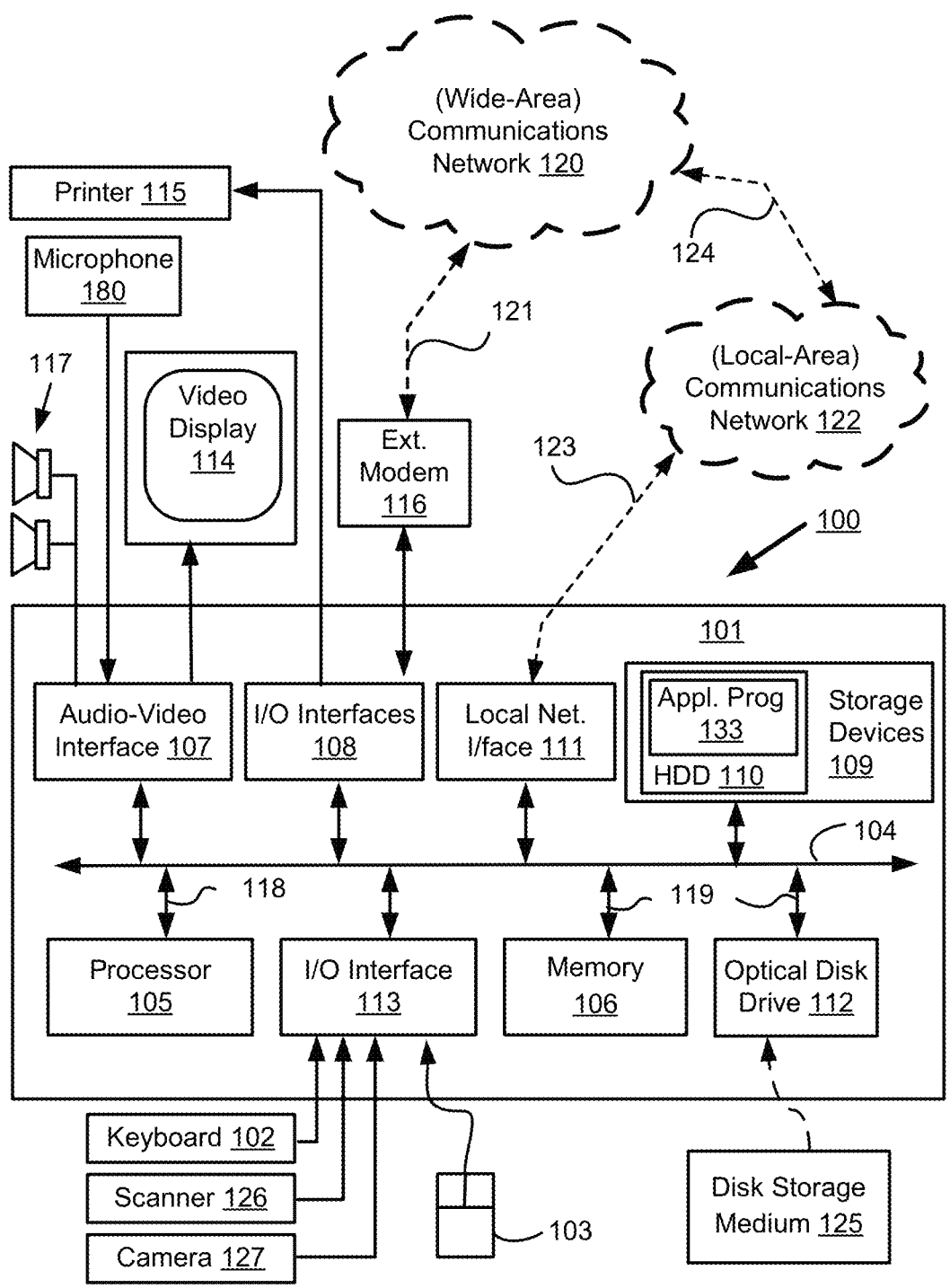
FIGS. 1A and 1B form a schematic block diagram of a general-purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Figure 1B:
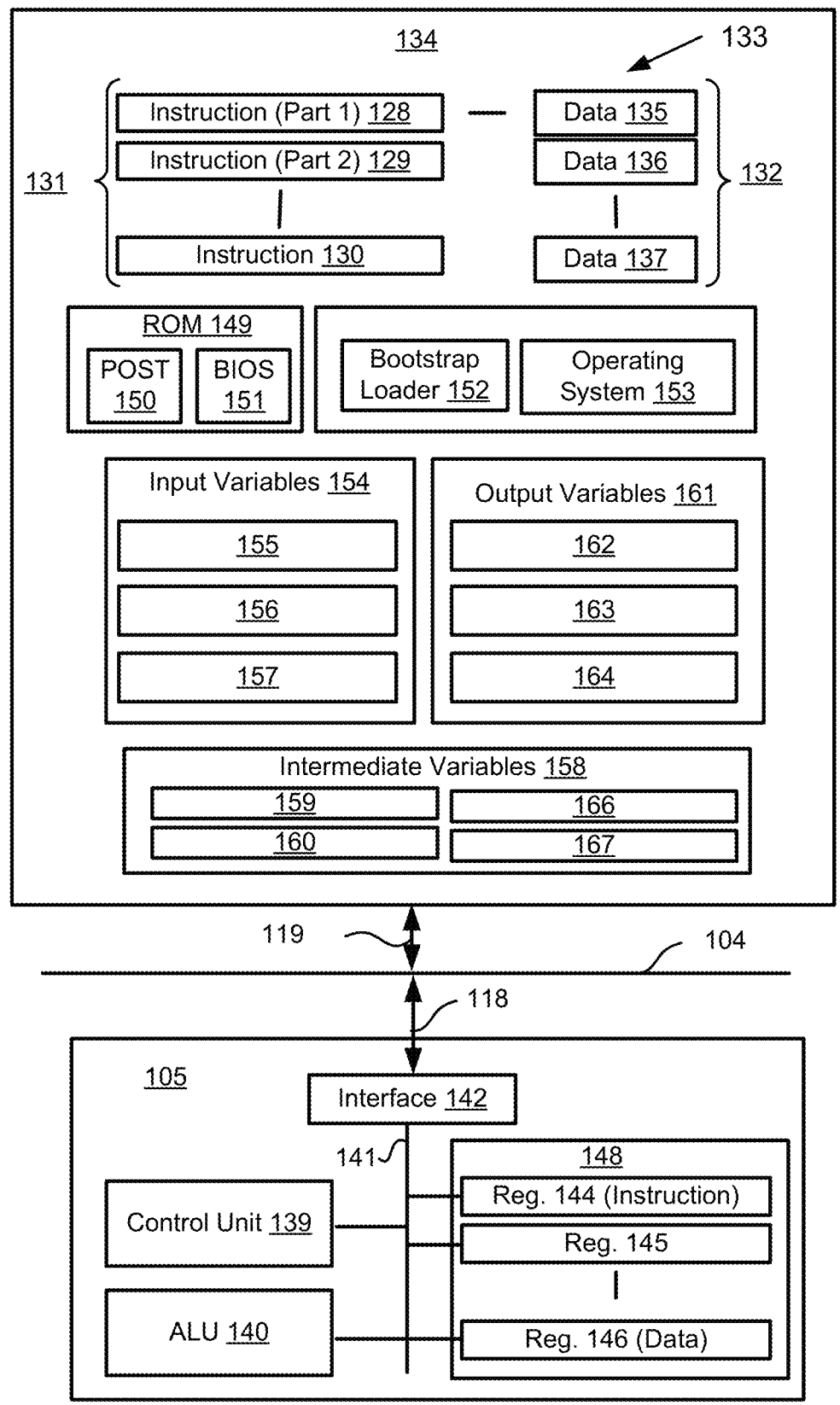

FIGS. 1A and 1B depict a general-purpose computer system 100, upon which the various arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g. cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "router" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

Processing of an electronic document to be described below may involve reading from and writing to the memory 106, the HDD 110, the display 114, and to the printer 115, or any combination of those destinations.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun SPARCstations, Apple Mac™ or a like computer systems.

The processing of an electronic document may be implemented using the computer system 100 wherein the processes of FIGS. 2 to 12, to be described, may be implemented as one or more software application programs 133 executable within the computer system 100. In particular, the steps of the processing of an electronic document are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the processing of an electronic document methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for processing an electronic document.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for determination of logical structure for a document.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed electronic document processing arrangements use input variables 154, which are stored in the memory 134 in corresponding memory locations 155, 156, 157. The electronic document processing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(i) a fetch operation, which fetches or reads an instruction 131 from a memory location 128, 129, 130;

(ii) a decode operation in which the control unit 139 determines which instruction has been fetched; and (iii) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 12 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The processing of an electronic document may alternatively be implemented in dedicated hardware such as one or more integrated circuits performing the functions or sub functions of the processing of an electronic document. Such dedicated hardware may include graphic processors, digital signal processors, or one or more microprocessors and associated memories. Such hardware may be implemented with the computer module 101 or one of the destination devices, such as the display 114 or the printer 115.

The logical structure of a document may be communicated from an author using various layout and formatting conventions. For example, a heading may be indicated by bold or slightly larger text. As another example columns may be visually separated using empty space between the columns. A further example is that paragraphs may be separated by additional vertical spacing, or first-line indenting, or a combination of both.

The logical structure of a document may be automatically detected by analysing the graphical objects, and then using the detected logical structure to transform the document in a second presentation mode. For example, a document that was intended for visual display may be transformed into speech using text-to-speech technology and be reproduced as audio. The detected logical structure may be used to determine the correct order in which text of the document should be converted to speech. In the methods described below, the analysis of graphical objects is performed using a clustering method. First, an area-of-interest is created for each graphical object, representing a potential structure element of the document. The area-of-interest stores information such as an enclosing region, the type of graphical object, such as image, text, or line art, colour information, and object depth. The enclosing region may comprise a coarse enclosing region and/or a fine enclosing region. The object depth is represented by z-depth of the object, where the z-depth is the number of other objects that overlap and are above a particular object. Two or more objects within a group of overlapping graphical objects may have the same z-depth. The areas-of-interest are combined using a clustering algorithm by calculating a distance between each pair of areas-of-interest. The two areas-of-interest with the smallest distance are combined to form a combined area-of-interest. The combining process requires an approximation of the combined colour and z-depth. Typically, combined areas-of-interest have a similar colour and z-depth, so approximating the combined colour and z-depth respectively is not problematic. The process of combining areas-of-interest repeats until a stopping condition is satisfied, typically being the distance between any two objects is greater than a constant value. The remaining areas-of-interest, representing structure elements, are organised into a structure tree. The structure tree describes the logical structure of the document. The structure tree is then used to transform the document into a second presentation mode and to reproduce the document in the second presentation mode. Therefore, the document may be reproduced according to the second presentation mode using the structure tree.

To calculate the distance between two areas-of-interest, a number of factors are taken into account. For example, the factors that may be taken into account include the amount of overlap of the enclosing regions, the types of graphical objects that contributed to the areas-of-interest, and whether the two areas-of-interest are separated by empty space on the page (e.g., the empty space between columns of text).

To identify the regions of empty space on a page, an empty space tree is created by recursively dividing the page into regions with horizontal and vertical cuts. A horizontal cut divides a region into three sub-regions: the top sub-region, an empty space sub-region, and the bottom sub-region. In one arrangement, only the top sub-region and bottom sub-region are recursively divided. Similarly a vertical cut results in three sub-regions: the left sub-region, and empty space sub-region, and a right sub-region. In one arrangement, only the left and right sub-regions are further divided recursively. To determine a preferred location of a horizontal or vertical cut within a region, a vertical and horizontal significance profile is created for the region. Each significance profile is analysed to determine a most important region of empty space. The most important region, from both the vertical and horizontal significance profiles, is used to determine the location of the preferred horizontal or vertical cut, respectively. The location of the preferred horizontal or vertical cut is used to subdivide the region, and the outer sub-regions (either top and bottom, or left and right) are further recursively divided. If there is no preferred horizontal or vertical cut, then the recursion stops.

A horizontal or vertical significance profile is generated by flattening the areas-of-interest in a region into a one-dimensional function in the horizontal or vertical direction, respectively. The significance profile, as a function, is the sum of the significance functions for all of the areas-of-interest within the region. The significance function of an area-of-interest depends only on the location within the region. For example, a significance function for an area-of-interest is typically zero outside the area-of-interest's boundary, and a positive constant value inside the area boundary. The constant value is referred to as the significance value of the area-of-interest. The significance value depends on the properties of the area-of-interest, such as the object types that contributed to the area, the approximate luminosity, and the approximate z-depth of the area-of-interest.

The advantage of the described method over prior art methods is that the prior art methods only consider the luminosity of pixels when calculating a significance profile. Background artefacts may impact the significance profile significantly, whereas as described below, background artefacts may be ignored due to the high z-depth or object type, which is not considered in the prior art.

The empty space tree, as previously described, is also used to determine the ordering of areas-of-interest when creating the structure tree. The empty space tree implicitly provides an ordering for all locations on a page, using an in-order traversal of the tree for determining the relative order of each sub-region. For each sub-region that is a leaf node in the tree, the typical render ordering may be used (i.e. first sorting vertically, and then horizontally). A list of areas-of-interest may be sorted using the abovementioned ordering on the centre point of each area-of-interest, the centre point being determined by the weighted average of the area-of-interest boundary.

Figure 2:
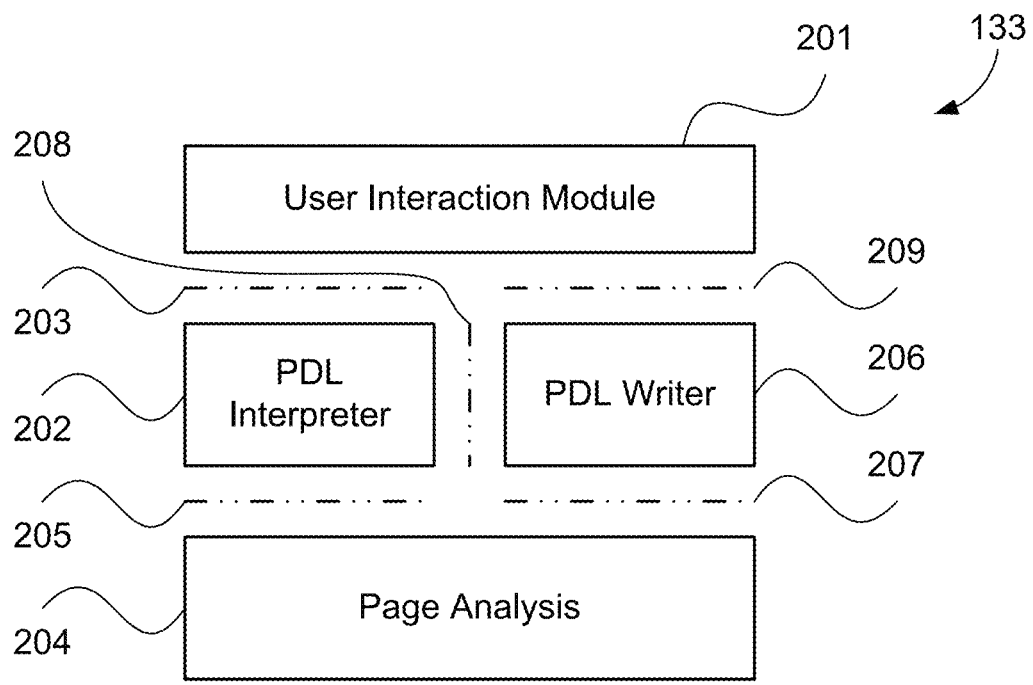
FIG. 2 is a schematic block diagram of an application program that can be executed by the general-purpose computer system of FIGS. 1A and 1B.

FIG. 2 shows a software system block diagram of the application program 133, which may be executed on the processor 105 as described above.

As seen in FIG. 2, the application program 133 comprises a user interaction module 201 that is responsible for interacting with the user of the computer system 100 as per the previous description of the second part of the software instructions 131. The user interaction will typically occur using input/output devices such as the video display 114, keyboard 102, mouse 103 and speakers 117. Any suitable method, such as touch-screen gestures, voice commands, command line interaction or the use of a window-based graphical user interface, may be used to implement the user interaction. The user interaction module 201 interacts with the user to select an electronic document file to be processed. There are many possible sources for the electronic document file, such as a file that is stored on the hard disk 110, or a file that is accessed over a local area network 122 via the local network interface 111. Once the user has selected an electronic document file to be processed, the user interaction module 201 provides a file handle of the file to a PDL interpreter module 202 via an interface 203.

The PDL interpreter module 202 reads the electronic document file using the file handle to produce a sequence of graphical objects, which are then provided to a page analysis module 204 via a second interface 205. The operation of the PDL interpreter module 202 is specific to the PDL being used to describe the document. For example, a PDL interpreter that can process ISO 32000 (PDF) documents will be different to a PDL interpreter that can process Microsoft XPS documents. It is also possible to include multiple PDL interpreter units (not shown) so that multiple PDL formats can be processed by the system. The PDL interpreter module 202 may perform functions such as decompression, tokenization, graphics state maintenance, and graphics command processing.

The page analysis module 204 is initialised by the user interaction module 201 (not shown). The page analysis module 204 generates, for each page, a sequence of areas-of-interest, to be described with reference to FIG. 4, and then provides this sequence to the PDL writer 206 via the third interface 207. The page analysis module 204 receives as input a sequence of graphical objects from the PDL interpreter module 202 via the second interface 205. The process executed by the page analysis module 204 will be described later with reference to FIG. 3.

The areas-of-interest that are generated by the page analysis module 204 are stored in memory 106 before being provided to PDL writer 206. The PDL writer 206 also receives the graphical objects from the PDL interpreter 202 via a fourth interface 208, along with the areas-of-interest via third interface 207. The PDL writer 206 combines the graphic commands with the areas-of-interest to create a second electronic document, which is provided to the user interaction module via a fifth interface 209. The second electronic document may be written to disk 110 or sent over either of the two communication networks 120 or 122.

Figure 4:
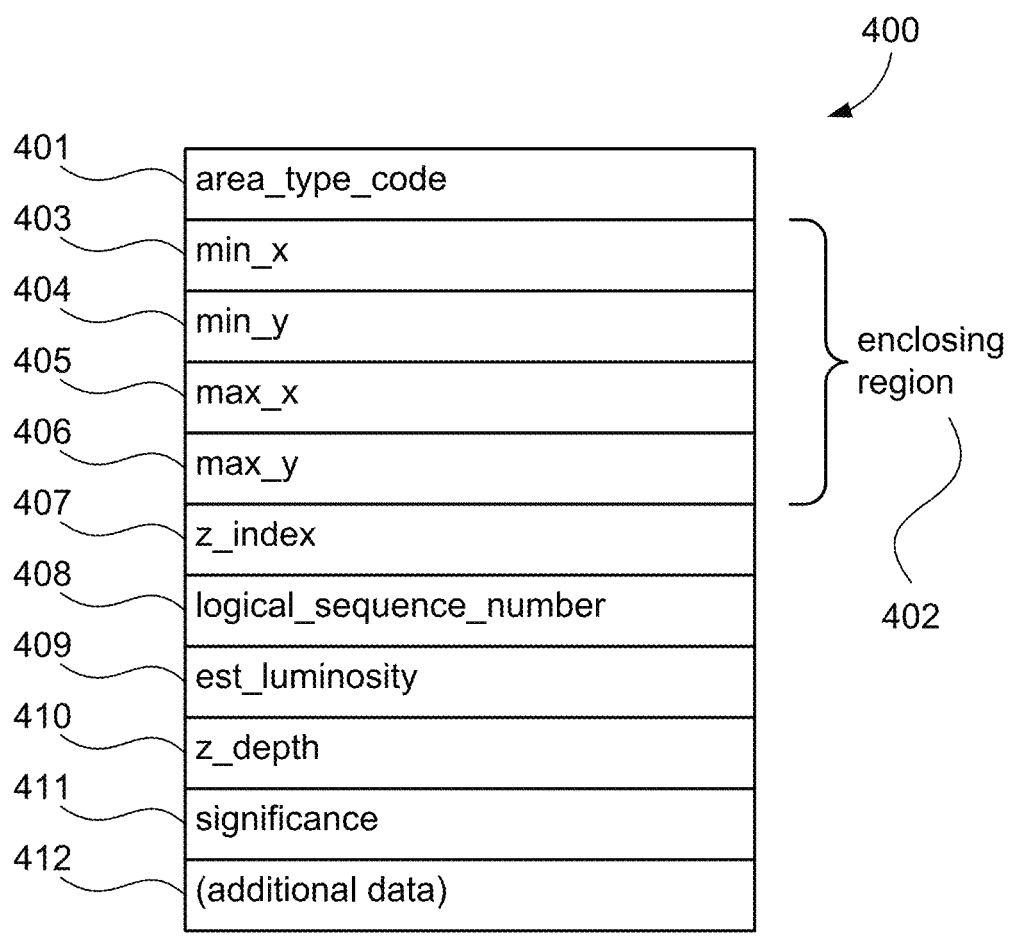
FIG. 4 is a schematic memory layout for an area-of-interest.

An example of the memory layout of one area-of-interest 400 is shown in FIG. 4. The area-of-interest 400 contains an area_type_code 401, which may have the value one (1) to represent a text area, two (2) to represent a line art area, four (4) to represent an image area, and eight (8) to represent a composite area. The enclosing region of the area-of-interest 400 is described in variables 402. The variables may represent a coarse enclosing region or a fine enclosing region. In one arrangement, the enclosing region is a bounding box, consisting of four variables: minimum x co-ordinate min_x 403, minimum y co-ordinate min_y 404, maximum x co-ordinate max_x 405, and maximum y co-ordinate max_y 406. The area-of-interest 400 also contains a z_index 407 which indicates the rendering order of the graphical objects that the area-of-interest represents. The z_index 407 allows for the determination of which areas-of-interest are on top of other areas-of-interest by comparing the values of the z_index 407 variables. Estimated luminosity est_luminosity 409 is determined depending on the type of the graphical object. Graphical objects with a flat colour may use the flat colour to determine an exact luminosity value. Graphical objects that represent a gradient may use the gradient stops to estimate the luminosity as would be appropriate for the gradient type. Images may use the value zero point five (0.5) as an estimated luminosity. There are alternative methods of estimating the luminosity requiring managing a trade-off between accuracy and performance. For example, the luminosity of an image may be determined by calculating the average of the luminosity of each pixel which would be more accurate than using the fixed value zero point five (0.5). However, calculating the average of the luminosity of each pixel is computationally more expensive.

Values of logical_sequence_number 408, z_depth 410 and significance 411 may remain uninitialised when the object is received from the PDL interpreter 202 as the logical_sequence_number 408, z_depth 410 and significance 411 values will be populated later in the process of the page analysis module 204.

An area-of-interest 400 may also contain additional data 412 that depends on area_type_code 401. For example, an area-of-interest that represents text with an area_type_code 401 with the value of one (1), may store additional glyph (e.g., font) or text information for the area-of-interest.

An intermediate data structure used by the page analysis module 204 is an empty space tree, which will now be described using an example shown in FIGS. 5A, 5B, 5C, 5D and 6. Empty space refers to a region of a page where the document author has created a space or gap in the page content so that a reader can identify the intended content flow (e.g. the space between two columns indicates that a first column should be read before a second column) Note, however, that empty space may include some graphical content, such as a light background colour or shading.

Figure 5B:
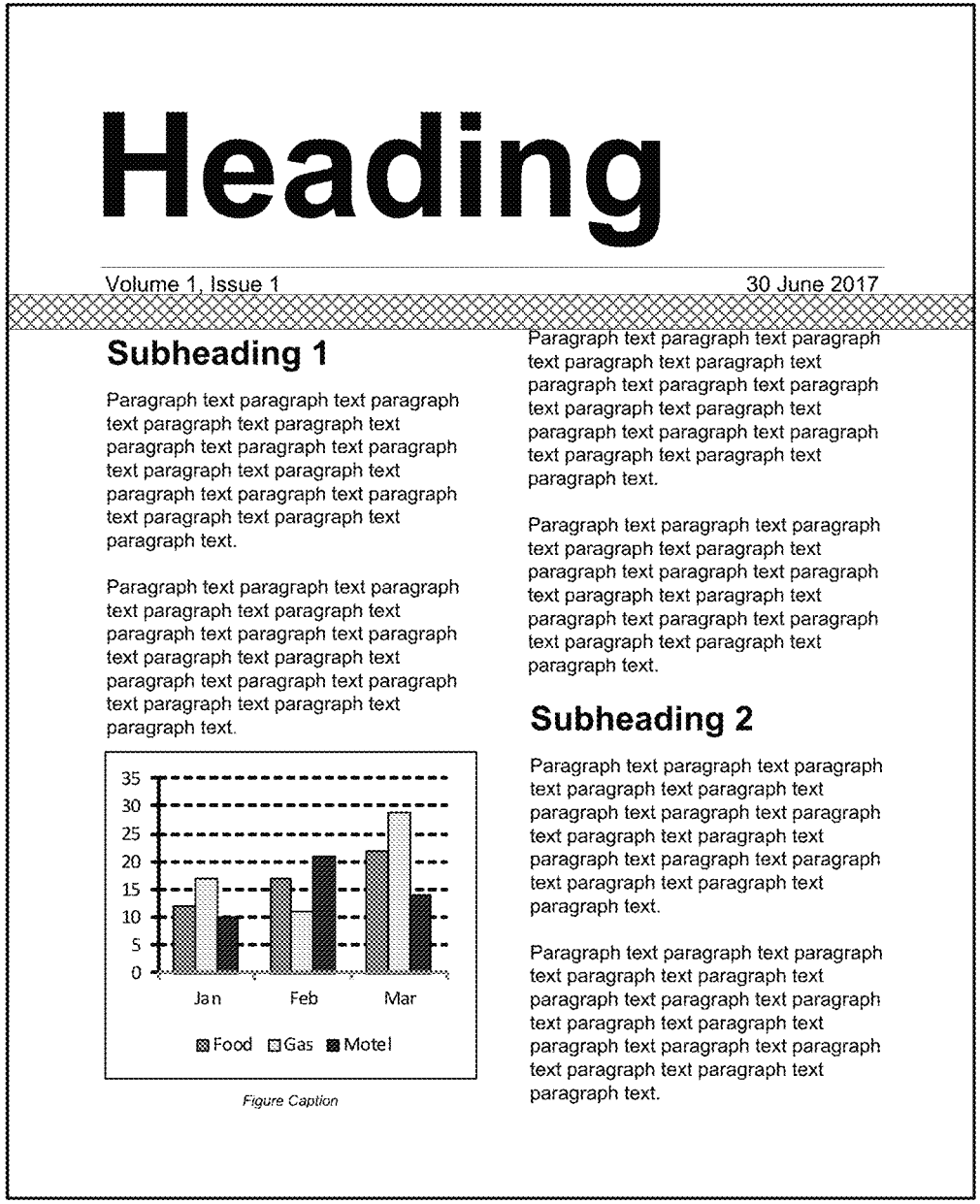
Figure 5C:
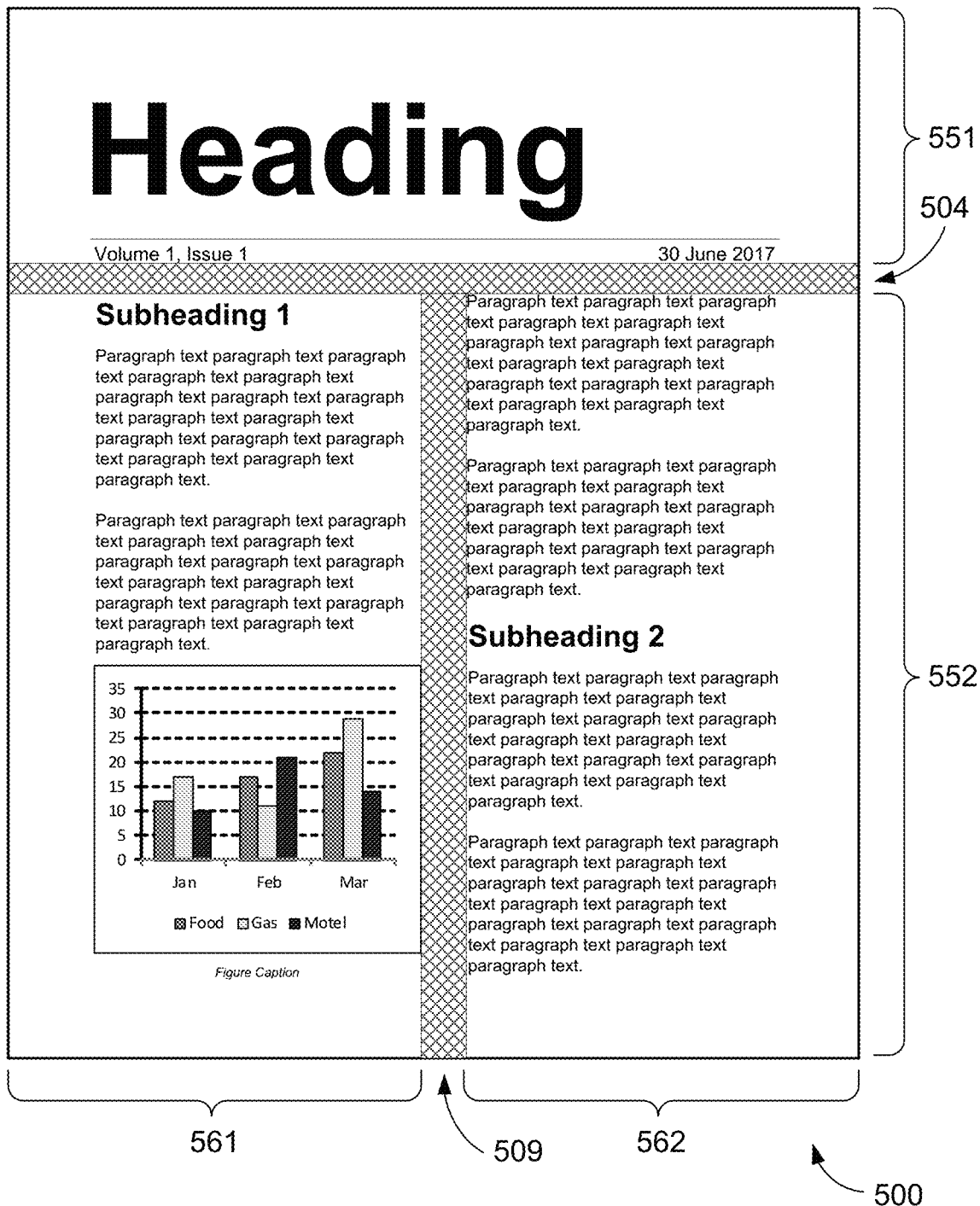
Figure 5D:
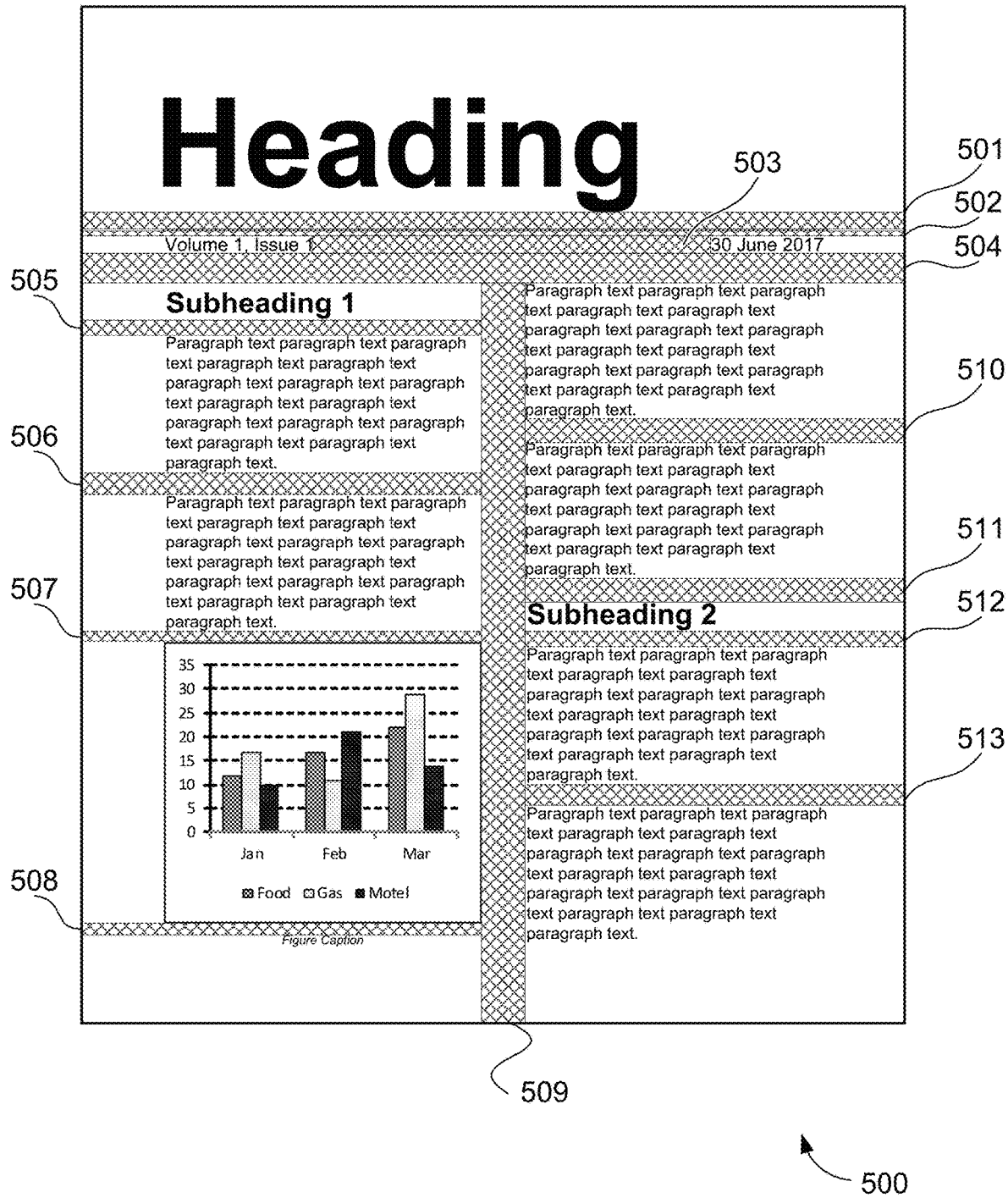

FIG. 5A shows an example of a page 500, which uses various page layout and formatting conventions. Graphical objects of the page 500 are positioned on the page 500 according to the page layout and formatting conventions. FIG. 5B shows the same page 500, with a horizontal cut determined by a significant region of empty space 504. The significant region of empty space 504 spans the full width of the page, dividing the page into three subregions: the top of the page 551, the significant region of empty space 504, and the bottom of the page 552. FIG. 5C shows the same page 500. However, in the example of FIG. 5C, the bottom of the page 552 is further subdivided with a vertical cut shown by a second empty space region 509. In the example of FIG. 5C, the second empty space region 509 subdivides the bottom of the page 552 into three subregions: left subregion 561, second empty space region 509, and right subregion 562. Generally, a cut divides a region into three subregions, where the outer regions may be further subdivided by further cuts. FIG. 5D shows such further recursive subdivision based on empty space regions 501, 502, 503, 504, 505, 506, 507, 508, 509, 510, 511, 512 and 513.

Figure 6:
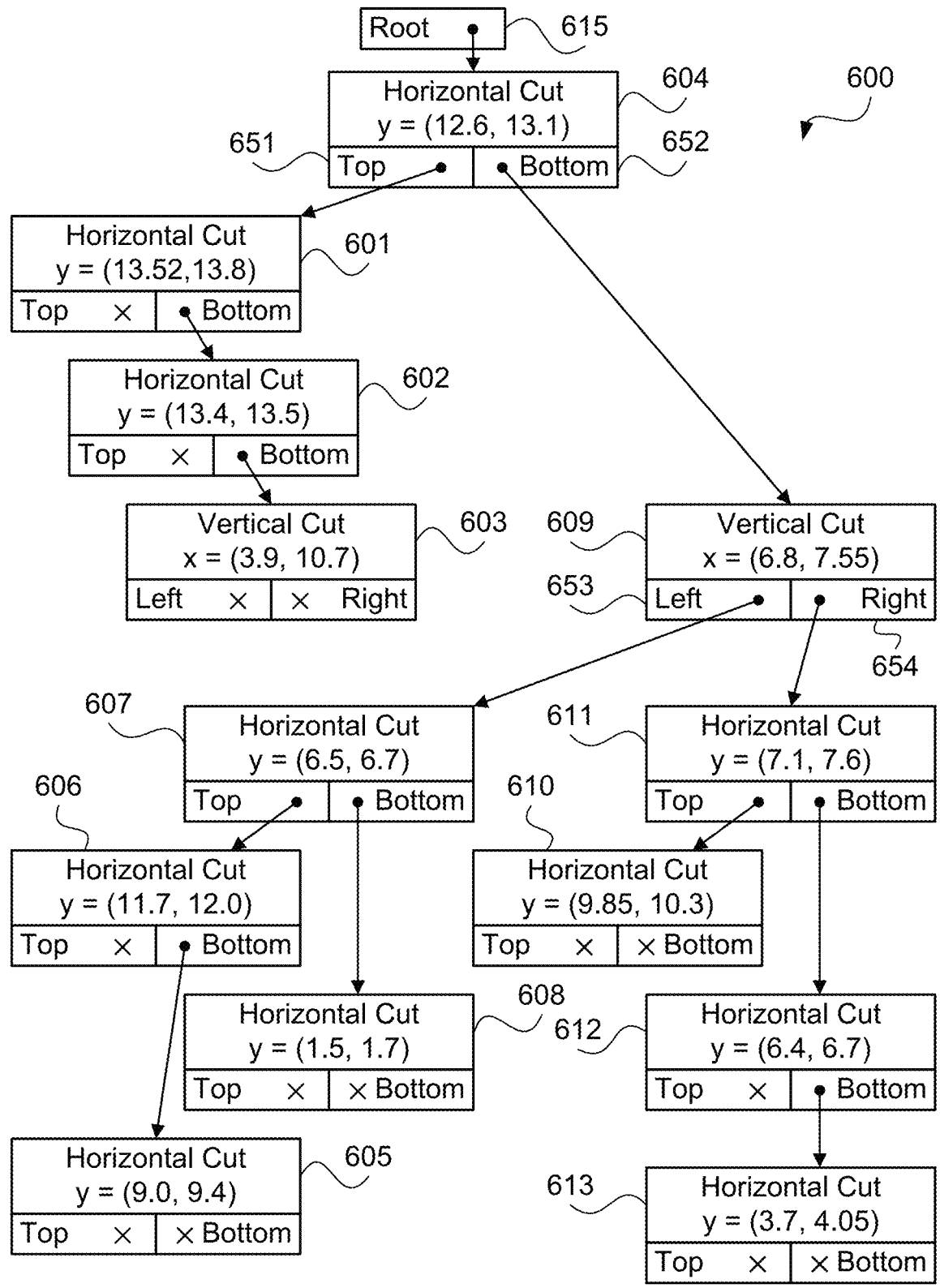
FIG. 6 is a schematic diagram of an example of an empty space tree, which corresponds with the empty space regions of the example document of FIGS. 5A, 5B, 5C and 5D.

FIG. 6 shows a tree representation 600 of the empty space regions 501-513 as shown in FIG. 5D. As seen in FIG. 6, root node 615, represents the entire page 500. If there were no cuts, the root node 615 may contain a NULL or similar value. In this example, the first horizontal cut 504 is represented by a first node 604, which is referenced from the root node 615. The first node 604 describes the first horizontal cut corresponding to the first empty space region 504. The node contains a y-span of (12.6, 13.1), describing the y-extents of the empty space region 504. The first node 604 contains two pointers to child nodes: the first pointer 651 representing the top subregion 551, and the second pointer 652 representing the bottom subregion 552. If there were no further subdivisions in either of the regions 551 and 552, then corresponding pointer(s) would be set to NULL.

However, in the case of the top subregion 551, the region 551 is further divided by another horizontal cut as determined by a second empty space region 501. The region 501 is represented by a second node 601, which is referenced by first pointer 651 in the first node 604. The y-extents of the second empty space region 501 are recorded in the node 601 corresponding to the top sub-region 551.

Similarly, in the case of the bottom subregion 552, the region 552 is further divided by a vertical cut as determined by a third empty space region 509. The region 509 is represented by a third node 609, which is referenced by second pointer 652. One difference between the third node 609 and the second node 601 is that the third node 609 represents a vertical cut, whereas the second node 601 represents a horizontal cut. Accordingly, the third node 609 records the x-extents of the third empty space region 509, rather than the y-extents that were recorded in the second node 601. The third node 609 also contains two child pointers, but in this case the first pointer 653 represents the left subregion and the second pointer 654 represents the right subregion of the vertical cut.

Nodes shown in FIG. 6 correspond to the further recursive cuts shown in FIG. 5D. In particular, nodes 601-613 correspond with the empty space regions 501-513 respectively.

Figure 3:
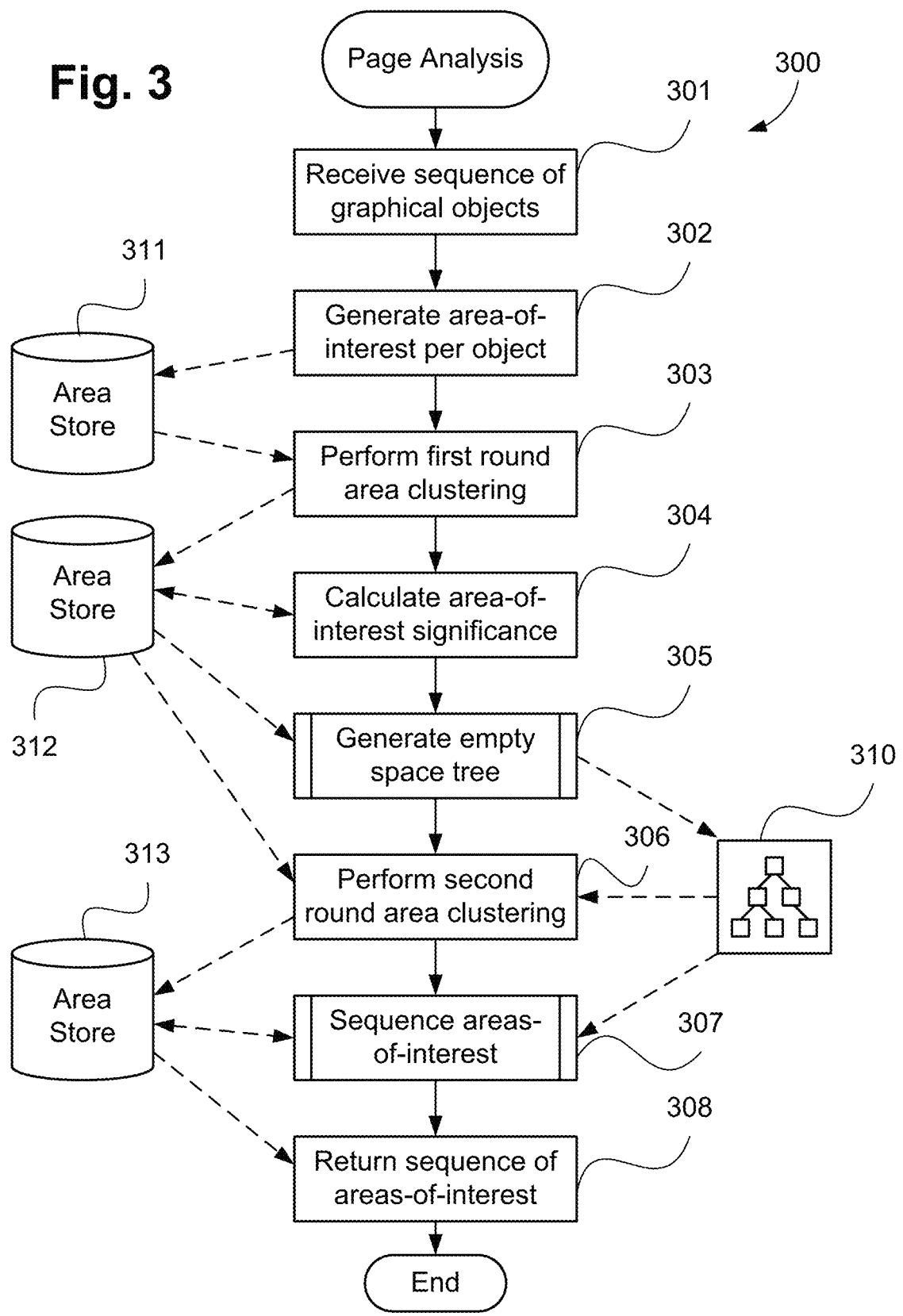
FIG. 3 is a schematic flow diagram showing a method of analysing a page of an electronic document, as shown in FIG. 2.

FIG. 3 shows a flowchart of showing a method 300 of analysing a page of an electronic document (e.g., the page 300). The method 300 is executed by the page analysis module 204 of the application program 133 resident in the hard disk drive and being controlled in its execution by the processor 105.

The method 300 begins at receiving step 301, where a sequence of graphical objects for the page being analysed is received from PDL interpreter module 202 under execution of the processor 105. Typically, graphical objects will be described by an arrangement of intermediate variables in memory 106. At generating step 302, an intermediate area-of-interest is generated for each graphical object 302. A set of areas-of-interest is stored in an area store 311 configured in memory 106. In a limited memory system, the PDL interpreter module 202 may provide a single graphical object at a time to the page analysis module 203. The intermediate area-of-interest that corresponds to the graphical object can be created, and then the memory for the graphical object may be made available for future graphical objects that are received from the PDL interpreter module 202.

The method 300 proceeds from step 302 to performing step 303, as shown in FIG. 3, where a first round of area clustering is performed. The first round of area clustering is used to reduce the number of areas-of-interest.

For example, some electronic document producers generate graphic commands that draw text a single glyph at a time, in which the previous step 302 would have created an area-of-interest for each glyph on the page. The text is drawn according to particular font information for the text. The areas-of-interest are preferably combined into areas-of-interest where each represents an entire paragraph of text. A single glyph has an origin and an advance vector, which when added to the origin determines the insertion point for the origin of the next glyph. The area-of-interest for a single glyph or line of text, in addition to the usual variables for an area-of-interest, can additionally store the origin of the first glyph and the insertion point of the last glyph. When the insertion point of one area-of-interest is very close to the origin of a second area-of-interest, then the two areas-of-interest are suitable for combining, and therefore the distance measure will reflect the closeness property of the two area-of-interest. In particular, the meaning of "very close" includes both floating point calculation errors, as well as taking into consideration the typical word spacing for the language represented by the text. Furthermore, the baseline of a text area-of-interest, which is the line defined by the origin and insertion point, may be used to identify suitably spaced lines of text for combination into a paragraph. Normally, lines of text are parallel and are separated by between 1.1 and 2.5 times the text size.

As another example, some electronic document producers divide an image into multiple tiles to reduce the memory required for individual images. Such images may be detected by identifying adjacent image areas-of-interest with a common edge. Typically such a pair of image areas-of-interest will overlap slightly, however there are some cases with a very small gap due to floating point calculations. As such, an overlap tolerance when calculating the adjacency of image areas-of-interest should be included in the distance calculation. The first round of area clustering 303 should detect this scenario and combine the areas-of-interest corresponding to the image tiles into a single area-of-interest representing the complete image.

As another example, a line art figure may be composed of many small overlapping graphical objects. As for the previous examples, the small areas-of-interest may be combined into a single area-of-interest that represents the overall line art figure. Reducing the number of intermediate areas-of-interest improves the processing time of the following steps. One method of implementing the step of combining the small areas-of-interest into a single area-of-interest is to perform a pair-wise comparison of all areas-of-interest, and use a set of rules (such as the rules described above) to combine areas-of-interest as required. The pair-wise comparison may be repeated until no areas-of-interest may be further combined.

The method 300 proceeds from step 303 to "calculate area-of-interest significance" step 304, where the areas-of-interest in second area store 312, configured within memory 106, is updated by populating the z_depth 410 and significance 411 members for each area-of-interest with the correct values. The z_depth is determined, for each area-of-interest, by counting the number of other areas-of-interest that both intersect the area-of-interest, and have a z_index strictly greater than the z_index of the area-of-interest. The significance 411 is determined according to Equation (1), below:

$$(1 obj_{lum}) \times C^{obj_{z\_depth}} \times w(obj_{type}) \qquad (1)$$

where $obj_{lum}$ is the estimated luminosity est_luminosity 409, C has the value 0.75, $obj_{z\_depth}$ is the z_depth 410, and $w(obj_{type})$ is a weighting function of the area_type_code 401.

$w(obj_{type})$ has the value nought-point-five (0.5) when area_type_code 401 is four (4) (i.e. an image), one (1.0) when area_type_code 401 is two (2) (i.e. line art), and two (2.0) when area_type_code 401 is one (1) (i.e. text).

The method 300 proceeds from step 304 to "generate empty space tree" step 305, where an empty space tree 310 is generated, under execution of the processor 105, using the areas-of-interest in the area store 312 that were generated from the "perform first round area clustering" step 303. A method 700 of generating an empty space tree, as executed at step 305, will be described later in more detail with reference to FIG. 7. The method 300 proceeds from step 305 to "perform second round area clustering" step 306, where the set of areas-of-interest in the area store 312 that were generated as a result of the "perform first round area clustering" step 303 are combined under execution of the processor 105. The areas-of-interest are combined at step 306 so that the resulting set of areas-of-interest group together logical elements of the page. For example, a heading may be grouped with the following paragraph(s) forming a logical section. As another example a caption may be grouped together with a figure or table, forming an area-of-interest that represents the whole of the logical table or figure. Similar to the "perform first round area clustering" step 303, one method of implementing step 306 is to perform a pair-wise comparison of all areas-of-interest, and calculate a distance between all pairs of areas-of-interest. The distances are used to combine areas-of-interest as required. A number of measures may contribute to the distance between two areas-of-interest.

Figure 17A:
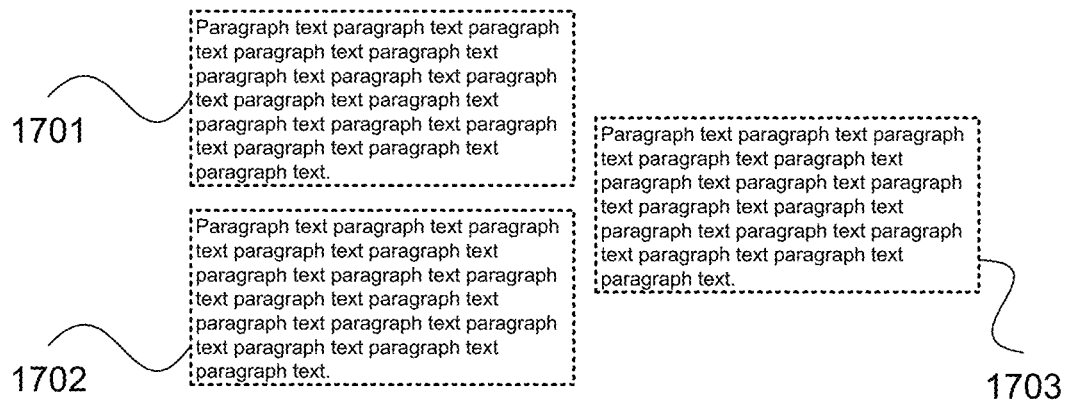
FIGS. 17A, 17B and 17C are diagrams of example areas-of-interest, showing the resulting combined areas-of-interest for two different cases.
Figure 17B:
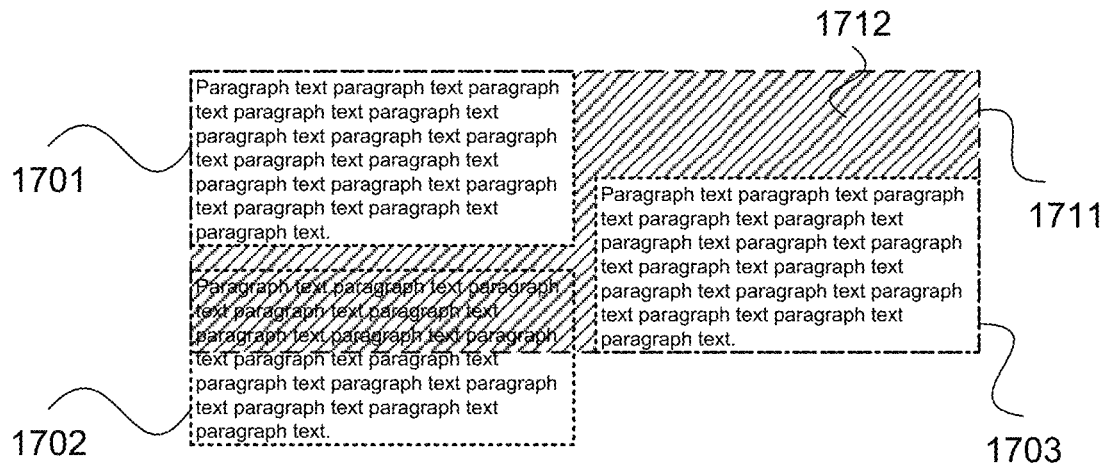
Figure 17C:
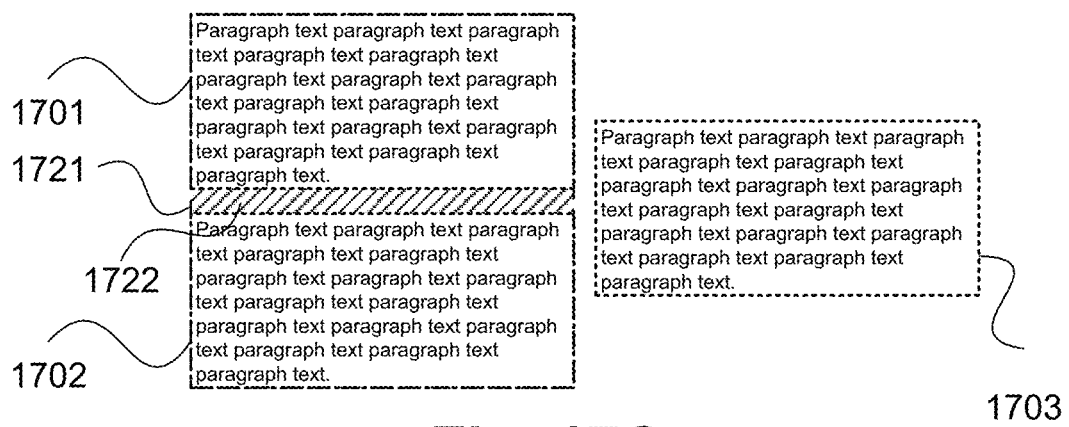

One measure of contributing to the distance between two areas-of-interest is to consider the amount of unused space that will be introduced by combining the two areas-of-interest. An example is shown in FIGS. 17A to 17C. FIG. 17A depicts three paragraphs, each of which is represented by an area-of-interest as indicated by boundaries 1701, 1702, 1703. In the example of FIG. 17B, the first area-of-interest 1701 and the third area-of-interest 1703 are combined, forming a combined area-of-interest 1711. Since the boundary of the combined area-of-interest is also represented using a rectangular bounding box, some unused space 1712 is introduced as shown in FIG. 17B. In an alternative example, the first area-of-interest 1701 and the second area-of-interest 1702 are combined, as shown in FIG. 17C. In the example shown in FIG. 17C, the alternative combined area-of-interest 1721 has a much smaller unused space 1722 when compared to the unused space 1712 of the first example shown in FIG. 17B. Therefore, it is desirable that the distance measure should indicate that combining the first area-of-interest 1701 and second area-of-interest 1702 is more favourable than combining the first area-of-interest 1701 and the third area-of-interest 1703.

Another measure to consider is whether the two areas-of-interest being compared are in different regions of the empty space tree 310 that was generated in the "generate empty space tree" step 305. If the two areas-of-interest are in the same subregion of the empty space tree 310, then the two areas-of-interest are likely to be suitable for combining. On the other hand, if the two areas-of-interest are in different subregions as determined by the empty space tree 310, then the in-order distance of the nodes that correspond to the two different subregions may be used as a penalty factor when deciding whether the two areas-of-interest are suitable for combining. The result of step 306 is a set of areas-of-interest grouping logical elements of the page, which are stored in a third area store 313 configured within memory 306.

At "sequence areas-of-interest" step 307, the set of areas-of-interest in the third area store 313 configured within memory 106 is updated with logical sequence numbers under execution of the processor 105. Step 307 is achieved with reference to the empty space tree 310 that was generated by the "generate empty space tree" step 305. A method 1100 of sequencing areas-of-interest, as executed at step 307, will be described below with reference to FIG. 11.

Finally, the method 300 proceeds from step 307 to "return sequence of areas-of-interest" step 308, where the sequence of areas-of-interest in the third area store 313 are returned to the PDL writer 206 via the third interface 207. The PDL writer 206 may use the sequence of areas-of-interest to generate a second electronic document. In one arrangement, the PDL writer supplements the original PDL document with the structure tree. For example, in PDF, a structure tree is added by including the/StructTreeRoot and related dictionaries in a document catalog dictionary. The added structure tree allows a PDF consumer application to display the document structure using separate user interface elements, which facilitates user navigation of the document.

Figure 7:
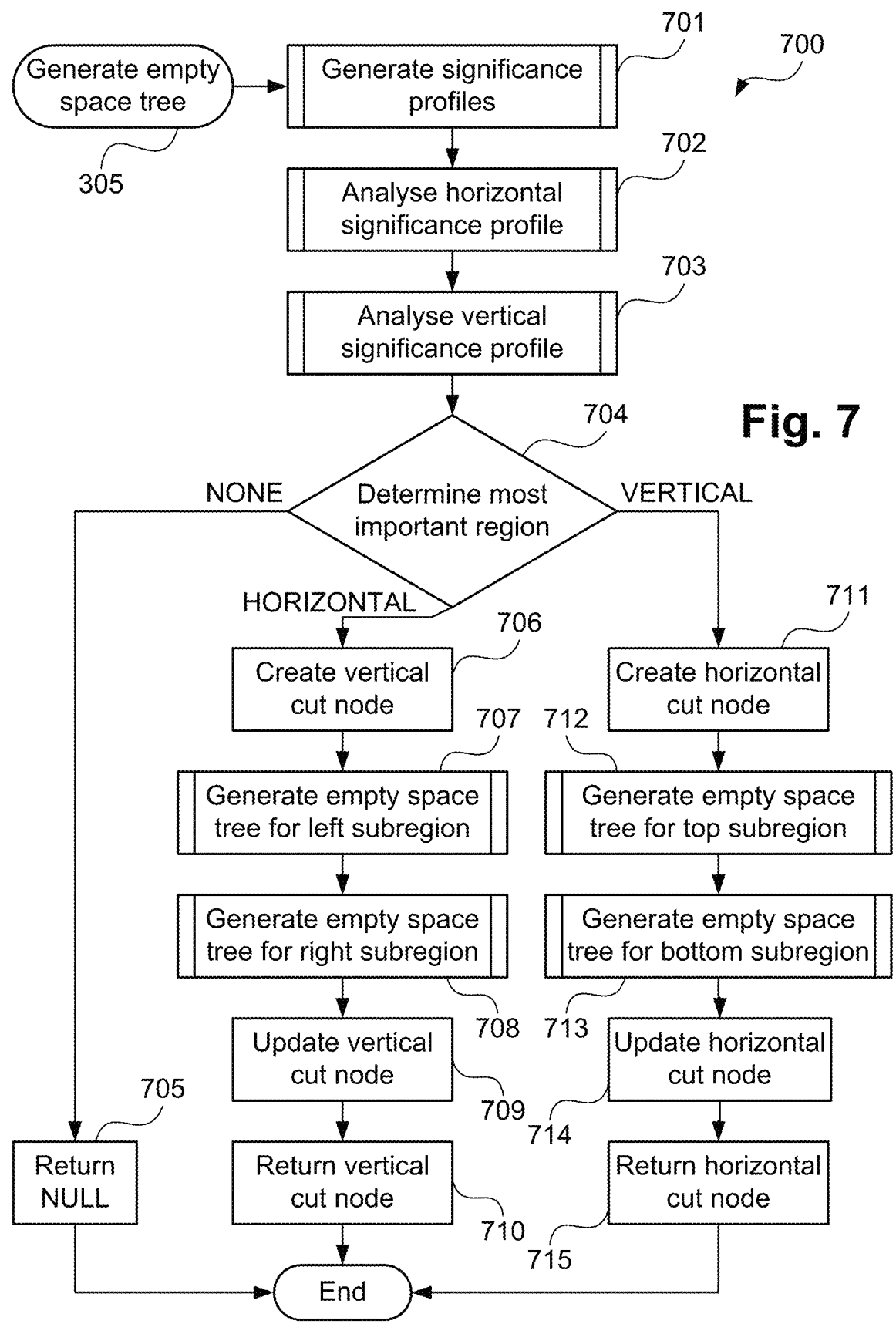
FIG. 7 is a schematic flow diagram showing a method of generating an empty space tree, as used in the method of FIG. 3.

A method 700 of generating an empty space tree, as executed at "generate empty space tree" step 305, will now be described in more detail with reference to FIG. 7. The method 700 may be implemented as one or more software application programs resident in the hard disk drive 110 and being controlled in its execution by the processor 105.

The method 700 requires, as inputs, a set of areas-of-interest and a region of the page for which an empty space tree will be generated. Initially, the region of the page in which to generate an empty space tree is the whole page (e.g., page 500). In later steps, the method 700 is executed recursively, in which the region will be a subregion of the page (e.g. subregion 551). The method 700, as an output, generates an empty space tree.

The method 700 begins at "generate significance profiles" step 701, where horizontal and vertical significance profiles are generated under execution of the processor 105. In one arrangement, the horizontal and vertical significance profiles are one-dimensional arrays that span the width and height respectively of the region for which an empty space tree will be generated. The size of each array is the width or height respectively of the region in inches multiplied by a pre-determined resolution. In one arrangement, a resolution of three-hundred (300) DPI is used. A resolution of three-hundred (300) DPI provides a good trade-off between processing efficiency (speed and memory usage) and accuracy of located important regions that will be later described. A method 800 of generating significance profiles, as executed at step 701, will be described below with reference to FIG. 8.

The method 700 proceeds from step 701 to "analyse horizontal significance profile" step 702. At step 702, the horizontal significance profile is analysed under execution of the processor 105. A method 900 of analysing a significance profile, as executed at step 702, will be later described with reference to FIG. 9, using the horizontal significance profile as an input. The output of step 702 is the most important region of empty space in the horizontal direction (later referred to as w-extents), or a special NONE value in the case where there is no significant region in the horizontal direction. The method 900 also provides a max_importance_score value that relates to the most important region of empty space in the horizontal direction (if present).

Similarly, at "analyse vertical significance profile" step 703, the method 900 is executed but instead uses the vertical significance profile as an input. The output of step 703 is the most important region of empty space in the vertical direction, or a special NONE value in the case where there is no significant region in the vertical direction. Similarly, the method 900 also provides a max_importance_score value that relates to the most important region of empty space in the vertical direction (if present).

Next, at "determine most important region" decision 704, if the "analyse horizontal significance profile" step 702 and the "analyse vertical significance profile" step 703 both return the special NONE value, then the method 700 proceeds to return NULL 705 and then the method 700 ends. Otherwise, the most important region from both the horizontal significance profile and the vertical significance profile is selected (if one of the most important regions is the special NONE value, then the other region is selected by default). The selection of the most important region is determined by the largest of the max_importance_score values that were returned by the "analyse significance profile" method 900.

In the case where the most important region is found in the horizontal significance profile, the method 700 progresses to the "create vertical cut node" step 706. In the case where the most important region is found in the vertical significance profile, the method 700 progresses to "create horizontal cut node" step 711.

At "create vertical cut node" step 706, an empty space tree node similar to the example 609 previously described in FIG. 6 is created under execution of the processor 105. The x-extents are populated with the range of x values in the most important region as determined from the horizontal significance profile. The left and right subtrees may remain uninitialized in step 706.

The method 700 proceeds from step 706 to "generate empty space tree for left subregion" step 707. At step 707, the "generate empty space tree" method 700 is recursively called. However, the input region is reduced at step 707 so that the maximum x value of the region is the minimum of the x-extents from the most important region as determined from the horizontal significance profile.

Similarly, at "generate empty space tree for right subregion" step 708, the "generate empty space tree" method 700 is recursively called. However, the input region is reduced at step 708 so that the minimum x value of the region is the maximum of the x-extents from the most important region as determined from the horizontal significance profile.

After the two calls to the "generate empty space tree" method 700, the vertical cut node that was created in the "create vertical cut node" step 706 is updated by "update vertical cut node" step 709. The left subtree is initialised with the empty space tree returned from the "generate empty space tree for left subregion" step 707, and the right subtree is initialised with the empty space tree returned from the "generate empty space tree for right subregion" step 708. Note that in both cases, the empty space tree returned may be NULL if there are no further significant empty space regions in either of the subregions. Finally, the vertical cut node is returned 710 and the method 700 concludes.

At "create horizontal cut node" step 711, an empty space tree node is created similar to the example node 604 previously described in FIG. 6. The y-extents of the empty space tree node created at step 711 are populated with the range of y values in the most important region as determined from the vertical significance profile. The top and bottom subtrees may remain uninitialized in step 711.

The method 700 proceeds from step 711 to "generate empty space tree for top subregion" step 712, where the "generate empty space tree" method 700 is recursively called. However, the input region is reduced at step 711 so that the minimum y value of the region is the maximum of the y-extents from the most important region as determined from the vertical significance profile.

Similarly, at "generate empty space tree for bottom subregion" step 713, the "generate empty space tree" method 700 is recursively called. However, the input region is reduced at step 713 so that the maximum y value of the region is the minimum of the y-extents from the most important region as determined from the vertical significance profile.

After the two calls to the "generate empty space tree" method 700 at steps 712 and 713, the horizontal cut node that was created in the "create horizontal cut node" step 711 is updated at "update horizontal cut node" step 714. At step 714, the top subtree is initialised with the empty space tree returned from the "generate empty space tree for top subregion" step 712, and the bottom subtree is initialised with the empty space tree returned from the "generate empty space tree for bottom subregion" step 713. Note that in both cases, the empty space tree returned may be NULL if there are no further significant empty space regions in either of the subregions. Finally, the horizontal cut node is returned at returning step 715 and the method 700 concludes.

Figure 8:
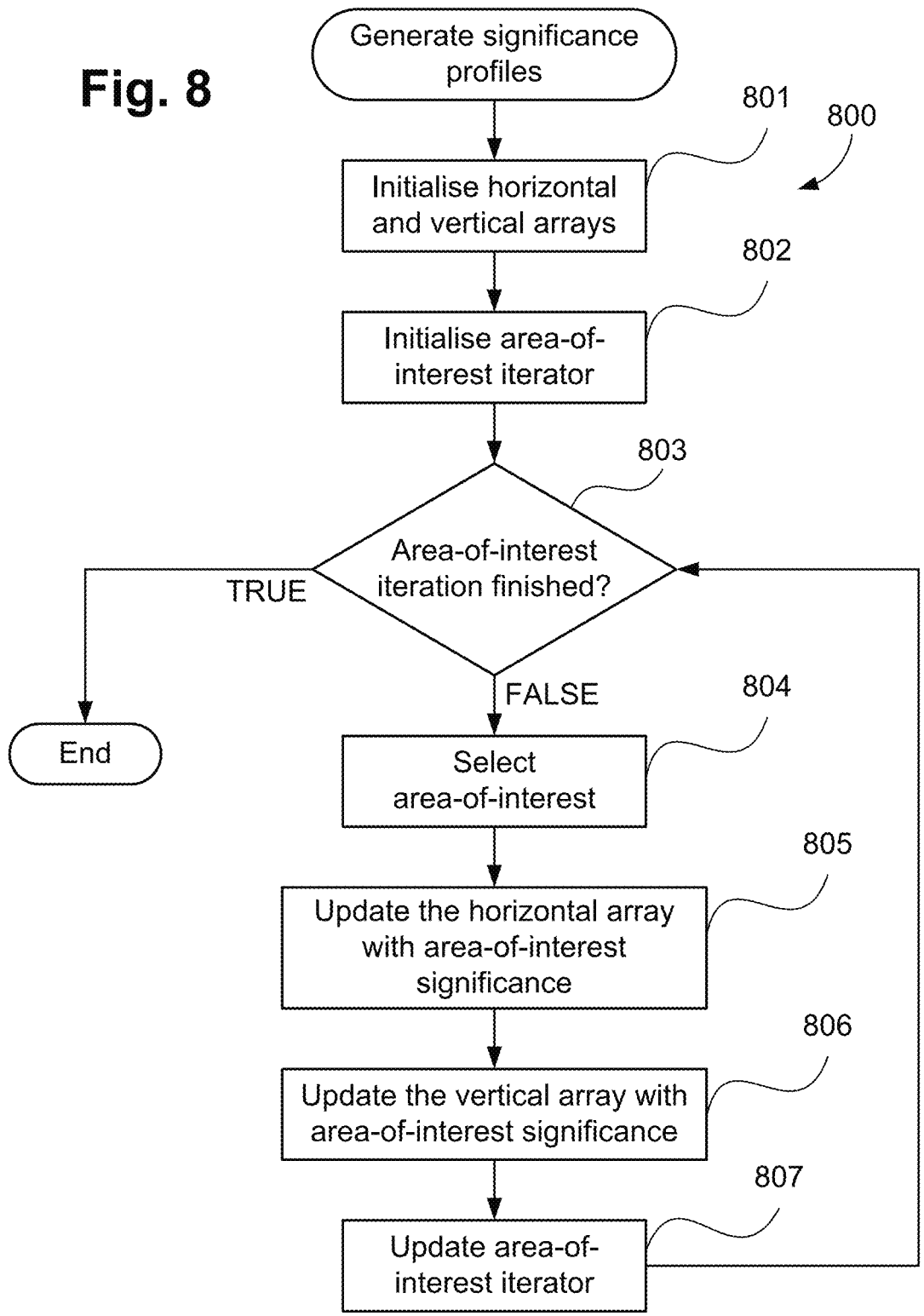
FIG. 8 is a schematic flow diagram showing a method of generating significance profiles, as used in the method of FIG. 7.

The method 800 of generating significance profiles, as executed at step 701, will now be described with reference to FIG. 8. The method 800 may be implemented as one or more software application programs resident in the hard disk drive 110 and being controlled in its execution by the processor 105.

The method 800 begins at "initialise horizontal and vertical arrays" step 801. At step 801, the elements of both arrays are initialized with zero. Next, at initialising step 802, an iterator 802 configured within memory 106 is initialised so that the method 800 can iterate through the set of areas-of-interest (the order is not important). Next, a decision is made as to whether or not there are any more areas-of-interest available according to the iterator 803. If there are no more areas-of-interest available, then the method 800 ends. Otherwise, the method 800 continues to selecting step 804 where an area-of-interest as determined by the iterator 804 is selected under execution of the processor 105.

The method 800 proceeds from step 804 to updating step 805, where the horizontal array is updated with the area-of-interest significance which was previously determined in the "calculate area-of-interest significance" step 304. The horizontal array is updated by adding the area-of-interest significance value 411 for the area-of-interest to all of the elements in the horizontal array that correspond with the horizontal extents of the area-of-interest enclosing region 402. In updating the horizontal array, the min_x 403 and max_x 405 values are multiplied by the same resolution as the horizontal array (300 DPI) to determine the range of elements in the horizontal array that should be updated.

Similarly, at updating step 806, the vertical array is updated with the area-of-interest significance, which was previously determined in the calculate area-of-interest significance step 304. The vertical array is updated at step 806 by summing the area-of-interest significance value 411 for the area-of-interest to all of the elements in the vertical array that correspond with the vertical extents of the area-of-interest enclosing region 402. In updating the vertical array, the min_y 404 and max_y 406 values are multiplied by the same resolution as the vertical array (300 DPI) to determine the range of elements in the vertical array that should be updated.

Finally, at updating step 807, the iterator is updated to progress to the next area-of-interest, and the method 700 returns to the decision as to whether or not there are any more areas-of-interest available according to the iterator 803.

Figure 9:
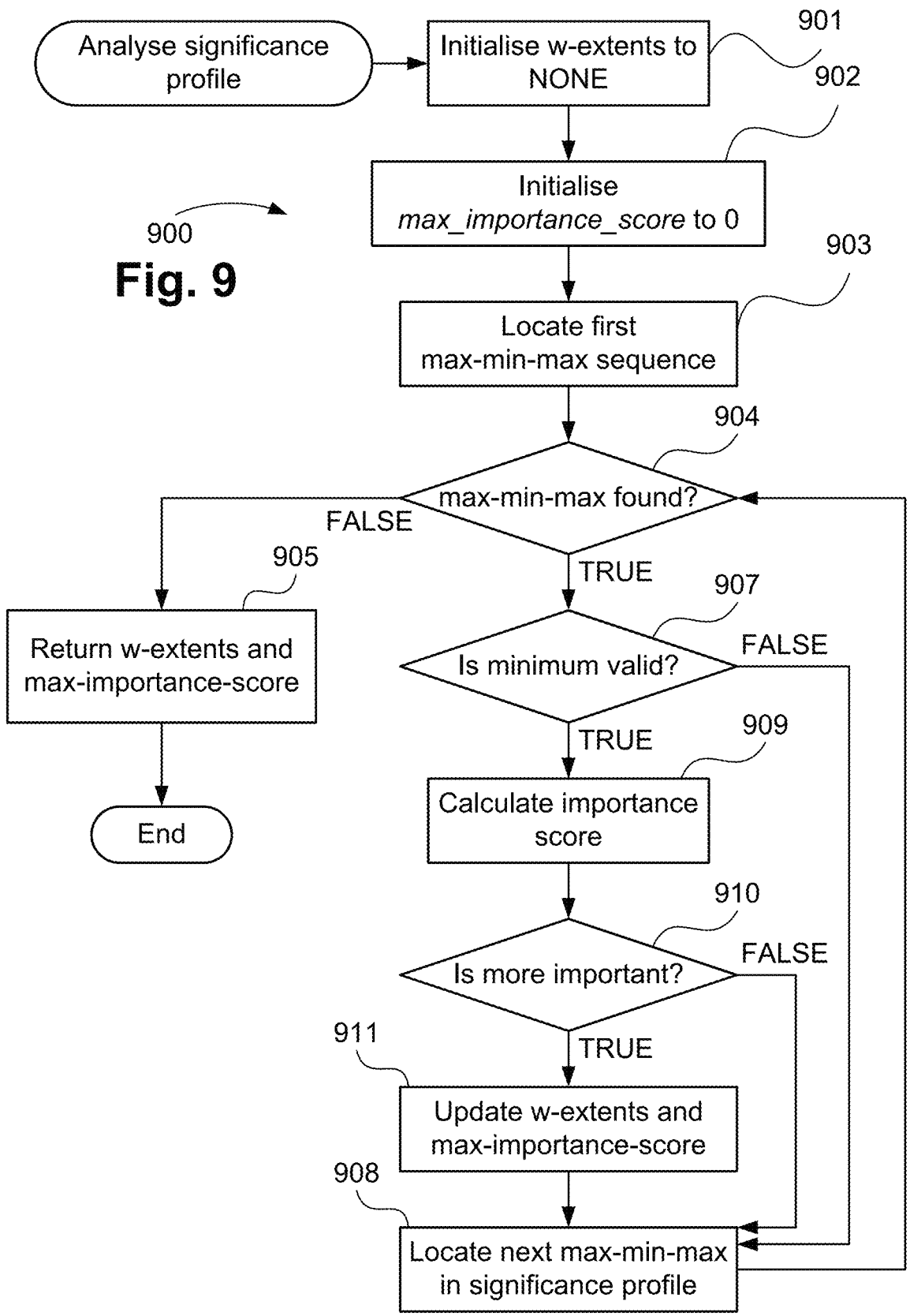
FIG. 9 is a schematic flow diagram showing a method of analysing a significance profile, as used in the method of FIG. 7.

The method 900 of analysing a significance profile, as executed at step 702, will now be described with reference to FIG. 9 and FIG. 10. Normally, the domain of the horizontal significance profile is the range of x-coordinates of the subregion, and the domain of the vertical significance profile is the range of y-coordinates of the subregion. However, since the method 900 can be applied to either the horizontal or vertical significance profiles, the description shall refer to w-coordinates when referring to the domain of the significance profile.

Figure 10:
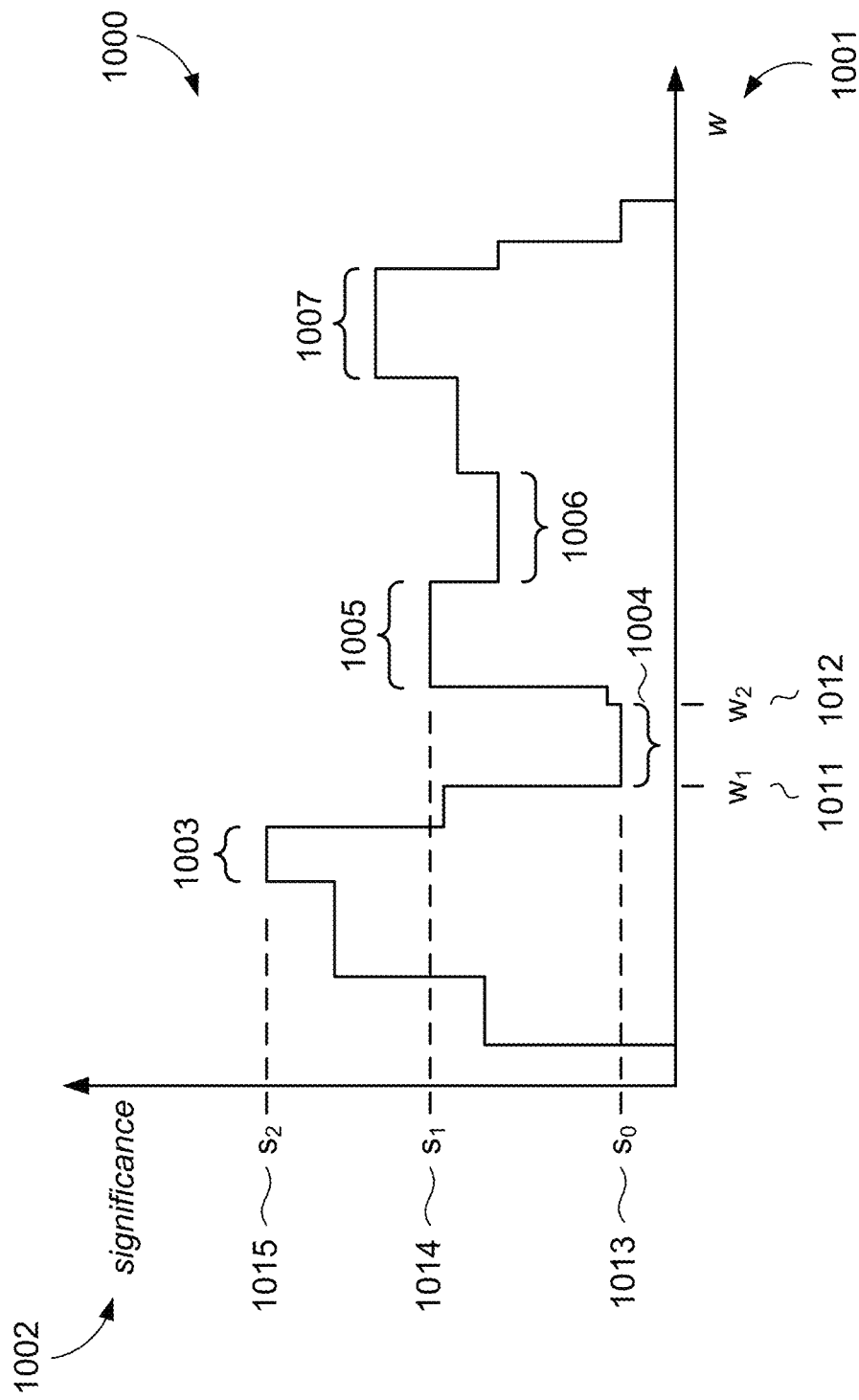
FIG. 10 is a graph of an example significance profile.

FIG. 10 shows a graph of an example significance profile 1000. The horizontal axis 1001 are w-coordinates and the vertical axis 1002 shows the significance value. Generally, the analyse significance profile method 900 iterates through each value in the significance profile array, identifying the locations of local minimums and the neighbouring local maximums, such as the max-min-max sequence 1003-1004-1005 as shown in FIG. 10. Another example of a max-min-max sequence 1005-1006-1007 is also shown in FIG. 10. The local minimums (such as the minimum 1004 and 1006) are analysed to determine the most important minimum (i.e. the most important region of empty space), which is then returned from the method 900. Note that, it is possible that no important minimum will be found, in which case a special NONE value may need to be returned from the method 900. Also note that the local minimums may span a range in the significance profile, such as the minimum 1004 shown in FIG. 10 that has w-extents $w_1$, $w_2$ (1011, 1012). The significance values of the maximum 1003, minimum 1004 and maximum 1005 are indicated by $s_2$ 1015, $s_0$ 1013 and $s_1$ 1014, respectively.

The method 900 may be implemented as one or more software code modules of the software application program 133 resident in the hard disk drive 110 and being controlled in its execution by the processor 105. The method 900 begins at initialising step 901, where the w-extents are initialised to NONE under execution of the processor 105. At step 901, the local variable that stores the w-extents of the minimum for which the importance score is calculated, is initialised. As the w-extents are array indices, a special value of negative one (−1) for NONE is suitable.

Throughout the method 900 an importance score is determined for each minimum, where the local minimum with the largest importance score is returned. At "initialise max_importance_score to 0" step 902, a local variable max_importance_score in which the largest importance score can be tracked, is initialised. The local variable max_importance_score corresponds to the location of the local minimum stored in the w-extents local variable. Some other known local variables are required in order to track and locate local minimums and maximums, the details of which are omitted for clarity.

The method 900 continues from step 902 to "locate first max-min-max in significance profile" step 903. Step 903 iterates through the significance array identifying a local minimum and two neighbouring local maximums, such as the minimum 1004 previously described with reference to FIG. 10. It is possible that such a minimum may not be found, in which the "max-min-max found" decision 904 will progress to the FALSE case and the method 900 proceeds to returning step 905. At step 905, the w-extents and most important score local variables are returned and the method 900 ends.

If, however, a max-min-max is found, then the "max-min-max found" decision 904 progresses to the TRUE case and the method 900 proceeds to decision step 907. At step 907, a decision is made as to whether or not the minimum is valid. The decision is made at step 907 to ensure that the minimum represents significantly empty space. In one arrangement, the minimum to be considered as valid if the significance (i.e., the value of $s_0$ 1013) is less than or equal to one (1.0). If the minimum is not valid as determined at the decision 907, then the method 900 moves to the "locate next max-min-max in significance profile" step 908. Step 908 is similar to the "locate first max-min-max in significance profile" step 903, except that the next max-min-max sequence that has not yet been analysed is determined. Following step 908, the method 900 then returns to the "max-min-max found" decision 904 and continues as previously described.

However, if the local minimum is considered to be valid at the "is minimum valid" decision 907, then an importance score is calculated at calculating step 909 for the located max-min-max. In one arrangement, the importance score is calculated according to Equation (2):

$$\frac{(w_2 - w_1) \times \max(s_1, s_2)}{(s_0 + 0.01)} \quad (2)$$

where, as previously described with reference to FIG. 10, $s_0$ is the significance value of the minimum, $s_1$ is the significance value of the second maximum, $s_2$ is the significance value of the first maximum, and $w_1$, $w_2$ are the w-extents of the minimum.

Next, at decision step 910, the importance score calculated in previous step 909 is compared with the importance score stored in the local variable max_importance_score variable. If the importance score calculated in the previous step 909 is greater than or equal to the value of the max_importance_score local variable, then the w-extents and max_importance_score local variables are updated at updating step 911 with the details from the current local minimum. The method 900 then continues to the "locate next max-min-max sequence in significance profile" step 908. If the calculated importance score is less than the value of the max_importance_score local variable, then the method 900 immediately proceeds to the "locate next max-min-max in significance profile" step 908.

Figure 11:
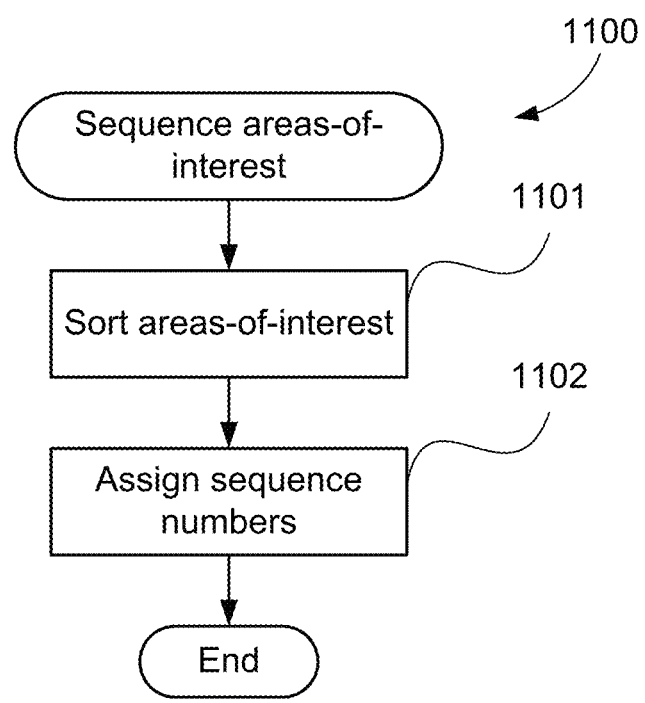
FIG. 11 is a schematic flow diagram showing a method of sequencing areas-of-interest, as used in the method of FIG. 3.
Figure 12:
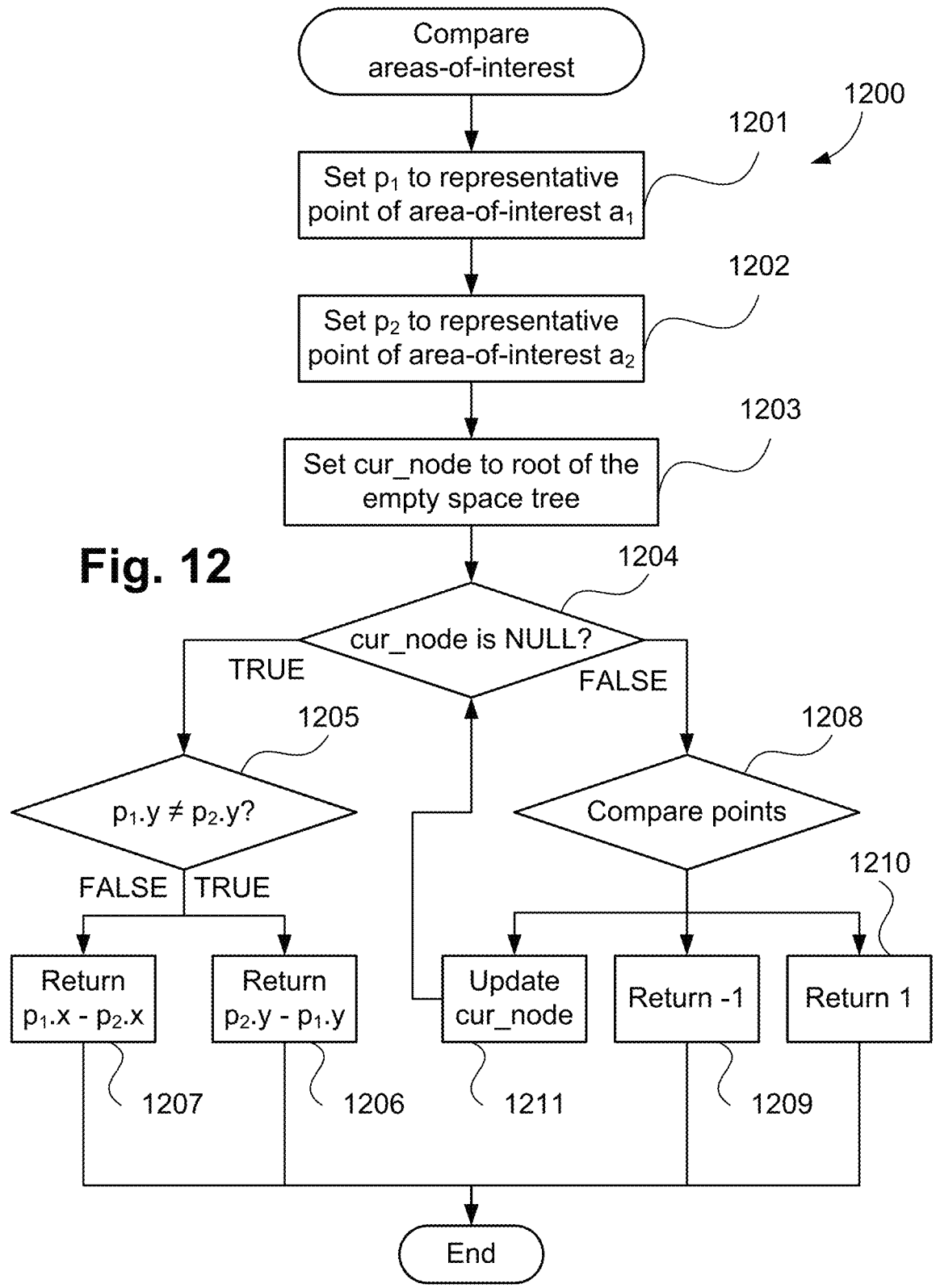
FIG. 12 is a schematic flow diagram showing a method of comparing two areas-of-interest, as used when sequencing areas-of-interest in the method of FIG. 11.

Returning to the page analysis method 300 of FIG. 3, the method 1100 of sequencing areas-of-interest, as executed at step 307 will now be described in detail with reference to FIG. 11 and FIG. 12. The method 1100 may be implemented as one or more software code modules of the software application program 133 resident in the hard disk drive 110 and being controlled in its execution by the processor 105.

The method 1100 begins at sorting step 1101, where the areas-of-interest are sorted, under execution of the processor 105, based on the position of the associated nodes in the empty space tree, or the x-coordinates and y-coordinates of the centre of the areas-of-interest if the areas-of-interest are associated with the same node in the empty space tree. The areas-of-interest are sorted using a standard sorting algorithm (e.g. quick sort) that uses a comparison function to compare areas-of-interest. A method 1200 of comparing two areas-of-interest, as executed at step 1101, is described below with reference to FIG. 12.

Then at "assign sequence numbers" step 1102, each area-of-interest is assigned a logical sequence number 408 in the order as determined by the sorting step 1101.

The method 1200 of comparing two areas-of-interest, as executed by the standard sorting algorithm during the area-of-interest sorting step 1101, will now be described in more details with reference to FIG. 12. The inputs to the method 1200 are two areas-of-interest, which will be referred to as $a_1$ and $a_2$. The method 1200 may be implemented as one or more software code modules of the software application program 133 resident in the hard disk drive 110 and being controlled in its execution by the processor 105.

The method 1200 returns a negative number if $a_1$ comes before $a_2$, a positive number if $a_1$ is after $a_2$, and zero if $a_1$ and $a_2$ are equivalent, which is standard for such a sort comparison function. The comparison method 1200 also makes reference to the empty space tree 310 that was previously generated by the method 700.

The method 1200 begins at setting step 1201 where $p_1$, which is a representative point for the first area-of-interest $a_1$, is determined under execution of the processor 105. In one arrangement, the enclosing region is represented as a bounding box, so a suitable representative point for $a_1$ is the centre of the bounding box. The x-coordinate of $p_1$, i.e. $p_1.x$, may be determined as the average of the min_x 403 and max_x 405 of the bounding box of $a_1$. The y-coordinate of $p_1$, i.e. $p_1.y$, may be calculated as the average of the min_y 404 and max_y 406 of the bounding box of $a_1$.

At setting step 1202, a representative point $p_2$ for the second area-of-interest $a_2$, is determined under execution of the processor 105. The representative point $p_2$ may be similarly determined using the enclosing region 402 of $a_2$ as was the case for $p_1$.

The method 1200 proceeds from step 1202, to initialising step 1203, where a local variable cur_node is initialised to the root node of the empty space tree 310.

Then at a "cur_node is NULL" decision step 1204, a decision is made to determine whether the two points $p_1$ and $p_2$ are in the same subregion of the empty space tree. If cur_node is NULL, then the method 1200 proceeds to comparing step 1205, where the two points $p_1$ and $p_2$ are compared using rendering order. If the "$p_1.y \neq p_2.y$" decision 1205 is TRUE, then the method 1200 proceeds to return step 1206, where the return value is $p_2.y - p_1.y$. If the "$p_1.y \neq p_2.y$" decision 1205 is FALSE, then the method 1200 proceeds to step 1207 where the return value is $p_1.x - p_2.x$. The method 1200 concludes following either of steps 1206 or 1207. The return value is positive if the elements are in-order, and negative if the elements are out-of-order, which is the standard for a sort comparison function.

Otherwise, if cur_node is not NULL at decision step 1204, then the method 1200 proceeds to decision step 1208 where a further decision is made to determine the next course of action. The decision at step 1208 is complex as there are many possible combinations. These combinations are summarised in the tables below.

If cur_node represents a horizontal cut with y-extents min_y and max_y, then the following Table 1 is used to decide the next action to be performed:

TABLE 1

|  | $p_1 \cdot y < min\_y$ | $min\_y \le p_1 \cdot y$ and $p_1 \cdot y < max\_y$ | $max\_y \le p_1 \cdot y$ |
|---|---|---|---|
| $p_2 \cdot y < min\_y$ | Update cur_node. (bottom subregion) | return −1 | return −1 |
| $min\_y \le p_2$ and $p_2 \cdot y < max\_y$ | return 1 | Update cur_node. (NULL) | return −1 |
| $max\_y \le p_2 \cdot y$ | return 1 | return 1 | Update cur_node. (top subregion) |

Similarly, if cur_node represents a vertical cut with x-extents min_x and max_x, then the following Table 2 is used to decide the next action to be performed:

TABLE 2

|  | $p_1 \cdot x < min\_x$ | $min\_x \le p_1 \cdot x$ and $p_1 \cdot x < max\_x$ | $max\_x \le p_1 \cdot x$ |
|---|---|---|---|
| $p_2 \cdot x < min\_x$ | Update cur_node. (left subregion) | return 1 | return 1 |
| $min\_x \le p_2 \cdot x$ and $p_2 \cdot x < max\_x$ | return −1 | Update cur_node. (NULL) | return 1 |
| $max\_x \le p_2 \cdot x$ | return −1 | return −1 | Update cur_node. (right subregion) |

Generally, a horizontal or vertical cut defines three sub-regions, and when the two points $p_1$ and $p_2$ fall into different subregions, the ordering of the subregions determines the order of the two points. The left-most or top-most subregions are selected first. The decision step 1208 proceeds to either return negative one (−1) at step 1209 or return one (1) at step 1210 if $p_1$ is in the first logical subregion or $p_2$ is in the first logical subregion, respectively. If both $p_1$ and $p_2$ fall into the same subregion as defined by the horizontal or vertical cut, then the method 1200 proceeds to "update cur_node" step 1211, where the value of cur_node is updated according to the values shown in the above Tables 1 an 2. After step 1211, the method 1200 then repeats the "cur_node is NULL" decision step 1204 using the updated value in cur_node.

The arrangement described with reference to FIGS. 2-12 allows for the generation of a second electronic document that contains logical structure information, from a first electronic document where such logical structure information may not be present. Such a second electronic document is advantageous in that the logical structure information may be used by applications to provide enhanced functionality such as document editing or text-to-speech conversion.

Figure 13:
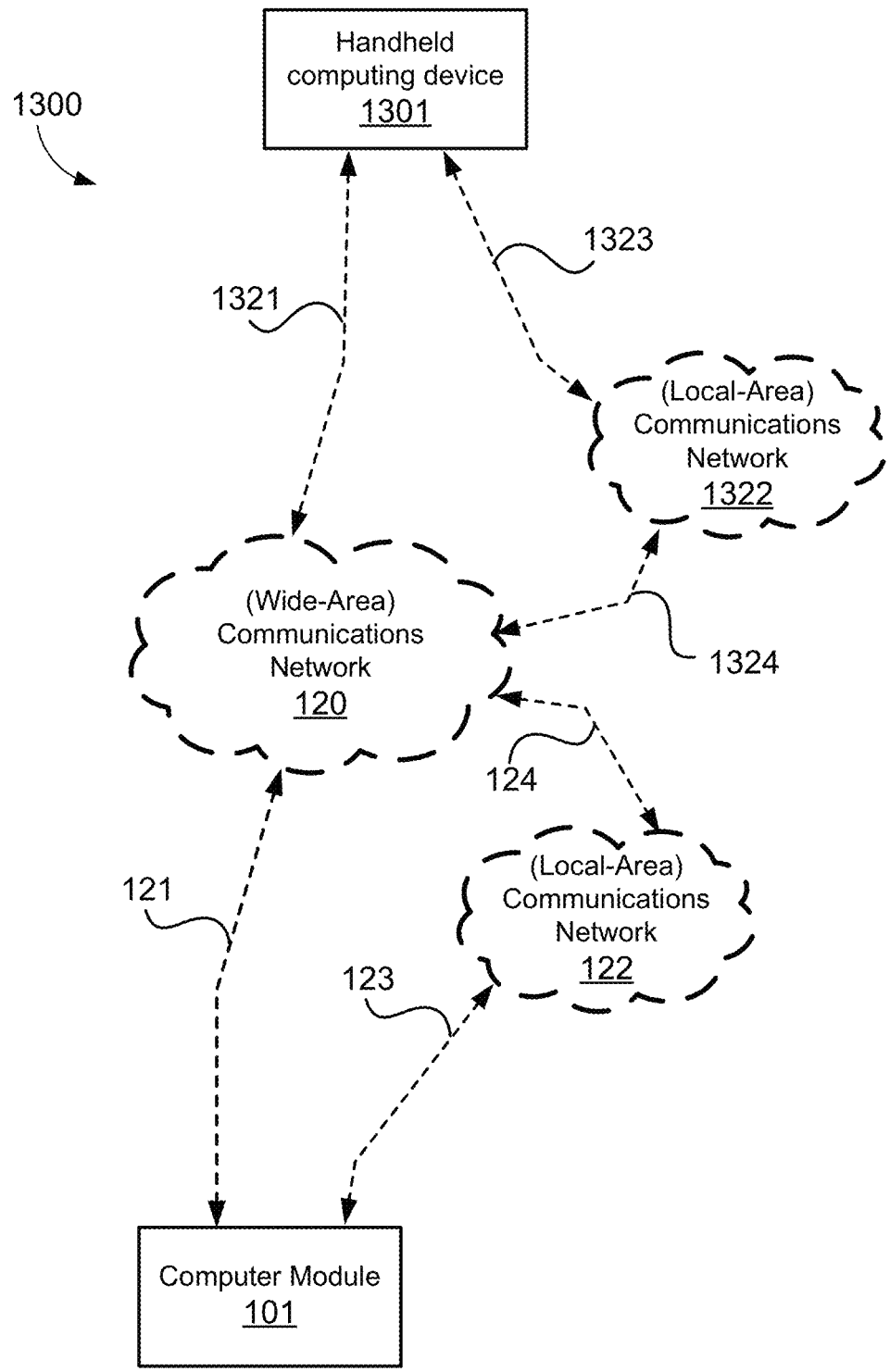
FIG. 13 is a schematic block diagram of a general-purpose computer system upon which arrangements described can be practiced.

FIG. 13 depicts a second computer system 11300, upon which the following arrangements described can be practiced. The second computer system 1300 includes the computer module 101, communications network 120, local-area communications network 122, connections 121, 123 and 124 as previously described with reference to FIG. 1A. Additionally, the second computer system 1300 includes a handheld computing device 1301, which contains similar components to that of the computer module 101. The handheld computing device 1301 is typically more portable, such as a smartphone or tablet computing device. Similarly, the handheld computing device 1301 includes a connection 1321 to the wide-area communications network 120, such as a cellular connection. The handheld computing device 1301 may also include a connection 1323 to a second local-area communications network 1322, similar to that of the connection 123 and local-area communications network 122 of the computer module 101. As shown in FIG. 13, the second local communications network 1322 may also couple to the wide network 120 via a connection 1324, which would typically include a so-called "router" device or device of similar functionality.

The arrangement shown in FIG. 13 provides several channels for communication between the computer module 101 and the handheld computing device 1301. Any combination of communication paths may be used to facilitate such communication, which can be utilised in the arrangements to be described.

Figure 14:
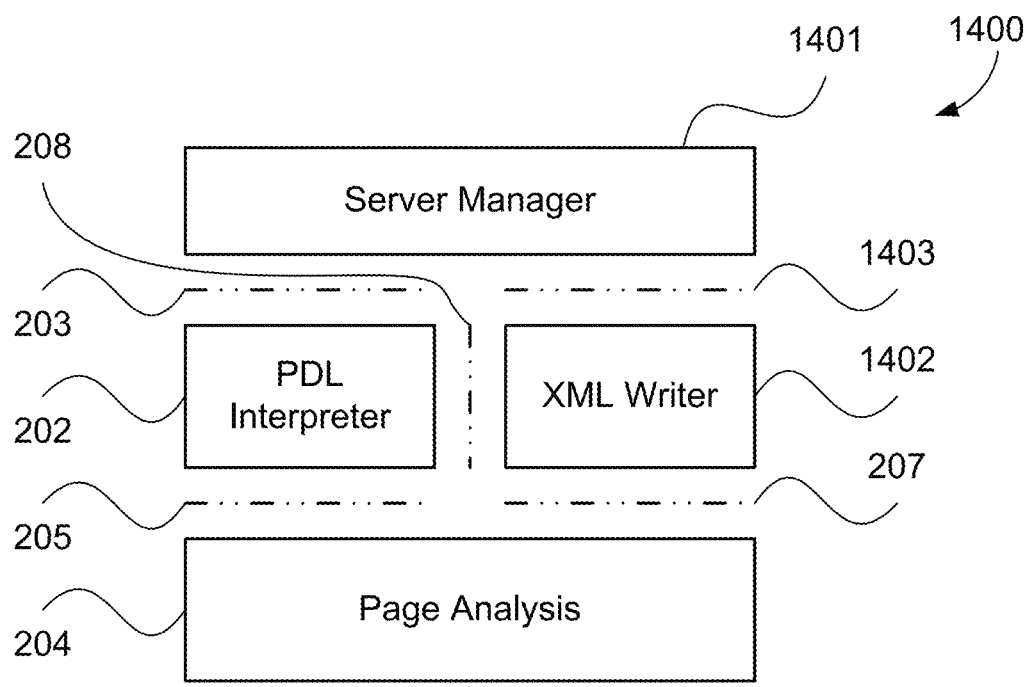
FIG. 14 is a schematic block diagram of a second software system that can be executed by the general-purpose computer system of FIG. 13.

FIG. 14 shows a software system block diagram of a second application program 1400, which may be executed on the processor 105 in a similar means to the application program 133 that was described above according to the description of FIGS. 1A, 1B.

The application program 1400 comprises a server manager module 1401 which is responsible for listening for incoming network connections on the wide-area network connection 121 or the local-area network connection 123 of the computer module 101. There are various means, such sockets, which may be used to facilitate the listening for incoming network connections on the wide-area network connection 121. The server manager module 1401 may be implemented using a remote procedure call (RPC) or similar to provide functions that may be used by a connecting client, such as the handheld computing device 1301. Such functions may include uploading an electronic document, and downloading an XML file.

If a connecting client uploads an electronic document, the server manager module 1401 provides a file handle of the file to PDL interpreter module 202 via an interface 203, as was the case for the application program 133 of FIG. 2.

In the example of FIG. 14, as was the case for the first application program 133 described in FIG. 2, the PDL interpreter module 202 reads the electronic document file using the file handle to produce a sequence of graphical objects, which are then provided to page analysis module 204 via a second interface 205. The page analysis module 204 is initialised by the server manager module 201 (not shown). The page analysis module 204 generates, for each page, a sequence of areas-of-interest, and then provides the sequence of areas-of-interest to the XML writer 1402 via the third interface 207. The page analysis module receives as input a sequence of graphical objects from the PDL interpreter module 202 via the second interface 205.

The areas-of-interest that are generated by the page analysis module 204 are stored in memory 106 before being provided to XML writer 1402. The XML writer 1402 also receives the graphical objects from the PDL interpreter 202 via a fourth interface 208, along with the areas-of-interest via the third interface 207. In one arrangement, the XML writer 206 may discard the graphic commands, but convert the areas-of-interest to an XML format, which is provided to the server manager module 1401 via a fifth interface 1403. The XML file may be written to disk 110 or sent over either of the two communication networks 120 or 122.

Figure 15:
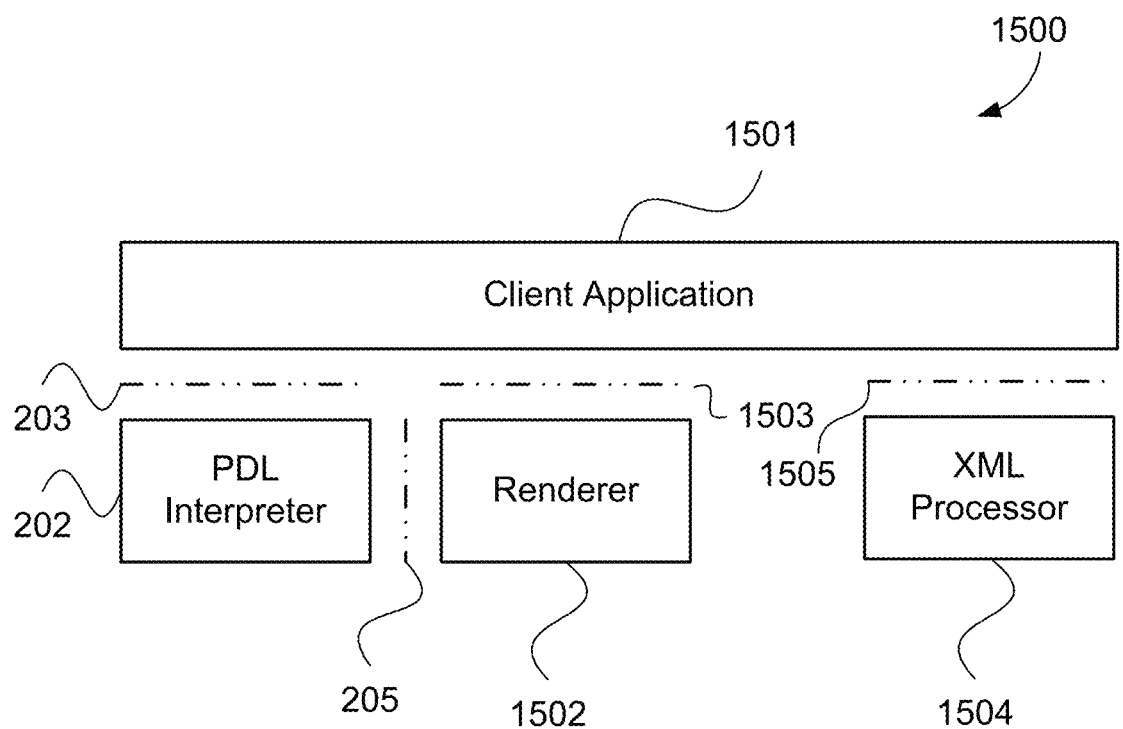
FIG. 15 is a schematic block diagram of a third software system that can be executed by the general-purpose computer system of FIG. 13.

FIG. 15 shows a software system block diagram of a third application program 1500, which may be executed on a processor (not shown) of the handheld computing device 1301.

As seen in FIG. 15, client application 1501 is a module of the third application program 1500 that is responsible for interacting with the user of the handheld computing device 1301. This user interaction may occur using input/output devices such as a touch display (not shown), microphone, and speakers. The client application 1501 interacts with the user to select an electronic document file to be processed. There are many possible sources for the electronic document file, such as a file that is stored in flash memory, a file that is accessed over a local-area network 1322, or a file that is accessed over a wide-area network 120. Once the user has selected an electronic document file to be processed, the client application 1501 provides a file handle of the file to the PDL interpreter module 202 via an interface 203.

As was the case for the first application program 133 described in FIG. 2, the PDL interpreter module 202 reads the electronic document file using the file handle to produce a sequence of graphical objects, which are then provided to a rendering module 1502 via a second interface 205. The rendering module 1502 is initialised by the client application 1501 via a sixth interface 1503. The rendering module 1502 generates a raster image of each page, and provides the sequence of images to the client application 1501 via the sixth interface 1503.

In the example of FIG. 15, while the rendering process is being executed by the renderer module 1502, the client application 1501 may simultaneously upload the electronic document file to the server manager module 1401 using RPC, and once the computer module 101 finishes generating an XML file for the uploaded electronic document, the XML file may be downloaded by the client application 1501. The downloaded XML file may be provided to an XML processor module 1504 via a seventh interface 1503. The XML processor module reads the XML file to reconstruct the areas-of-interest that were identified by the page analysis module 204 in the memory of the handheld computing device 1301.

Once both the rendering process of the renderer 1502 and the reconstruction process of the XML processor 1504 have completed, the client application 1501 may present to the electronic document to the user via a video display (not shown). The presentation of the electronic document to the user may be accomplished by displaying a region of the first page image, which corresponds to the first area-of-interest. The user may indicate to move to the next area-of-interest via a tapping a touch input display, or otherwise interacting with a graphical user interface. The client application 1501 may progress through the sequence of areas-of-interest, in turn displaying the corresponding region of the page image that was generated by the renderer module 1502. The sequence of the areas-of-interest was determined using the order defined by the empty space tree.

Such presentation of the electronic document to the user provides a more natural and convenient means for reading an electronic document, compared to displaying the full page.

The presentation of the electronic document in such a manner is particularly advantageous when the handheld computing device 1301 contains a display or screen that is significantly smaller than the intended page size of the electronic document.

Figure 16:
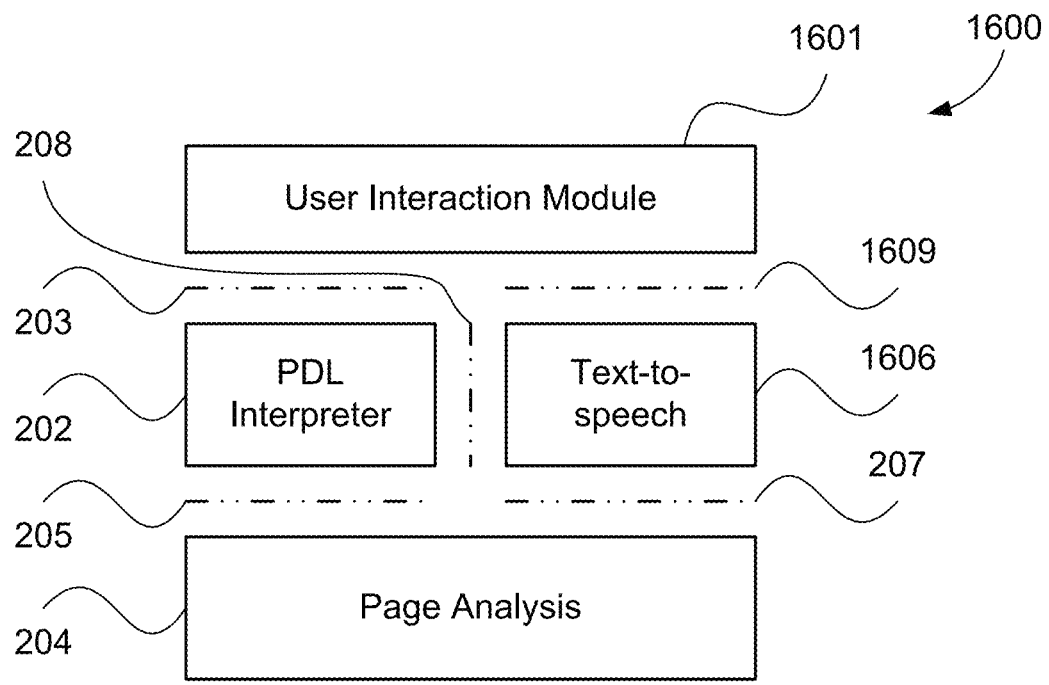
FIG. 16 is a schematic block diagram of a fourth software system that can be executed by the general purpose computer system of FIGS. 1A and 1B.

FIG. 16 shows a software system block diagram of a fourth application program 1600, which may be executed on the processor 105 in a similar means to the application program 133 that was described according to the description of FIGS. 1A and 1B.

The second user interaction module 1601 is a module of the fourth application program 1600 that is responsible for interacting with the user of the computer system 100 as per the previous description of the second part of the software instructions 131. This user interaction may occur using input/output devices such as the video display 114, keyboard 102, mouse 103 and speakers 117, as was the case with the first application program 200. The second user interaction module 1601 interacts with the user to select an electronic document file to be processed. There are many possible sources for the electronic document file, such as a file that is stored on the hard disk 110, or a file that is accessed over a local area network 122 via the local network interface 111. Once the user has selected an electronic document file to be processed, the second user interaction module 1601 provides a file handle of the file to the PDL interpreter module 202 via an interface 203, as was the case in the first application program 200.

The PDL interpreter module 202 reads the electronic document file as was previously described with reference to FIG. 2.

In the example of FIG. 16, the page analysis module 204 is initialised by the second user interaction module 1601 (not shown). The page analysis module 204 generates, for each page, a sequence of areas-of-interest, as was previously described with reference to FIG. 4, and then provides the sequence of areas-of-interest to the text-to speech module 1606 via a third interface 207. The page analysis module receives as input a sequence of graphical objects from the PDL interpreter module 202 via the second interface 205. The method 300 executed by the page analysis module 204 was previously described with reference to FIG. 3.

In the example of FIG. 16, the areas-of-interest that are generated by the page analysis module 204 are stored in memory 106 before being provided to the text-to-speech module 1606. The text-to-speech module 1606 also receives the graphical objects from the PDL interpreter 202 via a fourth interface 208, along with the areas-of-interest via the third interface 207. The text-to-speech module 1606 uses the text that is provided with some of the graphic commands and the sequence of areas-of-interest to create an audio representation of the document, by creating audio segments for each text graphical object, and then ordering the audio segments to match the ordering of the areas-of-interest. The audio representation of the document is provided to the second user interaction module 1601 via a sixth interface 1609. The audio representation of the document can be used to generate sound using the speakers 117 of the computer system 100 of FIGS. 1A and 1B.

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of processing a page of a document, the method comprising:
receiving a plurality of commands describing graphical objects of the page configured to be reproduced in a first presentation mode, the plurality of commands indicating a type of each of the graphical objects, an enclosing region and a drawing order associated with each of the graphical objects;
determining an object significance score for each of the graphical objects using an object type and an object depth of the each of the graphical objects, the object depth being determined using the drawing order indicated by the plurality of commands;
determining logical structure elements of the page using the determined object significance scores and the enclosing regions associated with the graphical objects; and
processing the plurality of commands according to the determined logical structure elements and a second presentation mode which is different from the first presentation mode.

2. The method according to claim 1, wherein the object depth is a number of objects that overlap a particular object.

3. The method according to claim 1, wherein the enclosing region is a bounding box.

4. The method according to claim 1, wherein the enclosing region for a graphical object is determined based on the object type.

5. The method according to claim 1, wherein the enclosing region for an image type graphical object is determined based on a transform and a width and height of the image type graphical object.

6. The method according to claim 1, wherein the enclosing region for a glyph type of graphical object is determined based on font and a set of control points.

7. The method according to claim 1, wherein the logical structure elements are determined using coarse enclosing regions.

8. The method according to claim 1, further comprising performing a text-to-speech conversion, and wherein the first presentation mode is a text presentation mode, and the second presentation mode is a speech presentation mode.

9. The method according to claim 1, further comprising:
determining, based on the enclosing region, a group of overlapping graphical objects;
determining object depth for each of the graphical objects in the group using the drawing order indicated by the plurality of commands; and
determining an object significance score for the graphical objects in the group using the determined object depths.

10. An apparatus for processing a page of a document, the apparatus comprising:
one or more memories storing instructions; and
one or more processors, that upon execution of the instructions are configured to perform operations including:
receiving a plurality of commands describing graphical objects of the page configured to be reproduced in a first presentation mode, the plurality of commands indicating a type of each of the graphical objects, an enclosing region and a drawing order associated with each of the graphical objects;
determining an object significance score for each of the graphical objects using an object type and an object depth of the each of the graphical objects, the object depth being determined using the drawing order indicated by the plurality of commands;
determining logical structure elements of the page using the determined object significance scores and the enclosing regions associated with the graphical objects; and
processing the plurality of commands according to the determined logical structure elements and a second presentation mode which is different from the first presentation mode.

11. A system for processing a page of a document, the system comprising:
a memory for storing data and a computer program;
a processor coupled to the memory for executing the computer program, the computer program having instructions for:
receiving a plurality of commands describing graphical objects of the page configured to be reproduced in a first presentation mode, the plurality of commands indicating a type of each of the graphical objects, an enclosing region and a drawing order associated with each of the graphical objects;
determining an object significance score for each of the graphical objects using an object type and an object depth of the each of the graphical objects, the object depth being determined using the drawing order indicated by the plurality of commands;
determining logical structure elements of the page using the determined object significance scores and the enclosing regions associated with the graphical objects; and
processing the plurality of commands according to the determined logical structure elements and a second presentation mode which is different from the first presentation mode.

12. A non-transitory computer readable medium having instructions stored thereon for processing a page of a document that, when executed by one or more processors, configures the one or more processors to perform operations comprising:
receiving a plurality of commands describing graphical objects of the page configured to be reproduced in a first presentation mode, the plurality of commands indicating a type of each of the graphical objects, an enclosing region and a drawing order associated with each of the graphical objects;
determining an object significance score for each of the graphical objects using an object type and an object depth of the each of the graphical objects, the object depth being determined using the drawing order indicated by the plurality of commands;
determining logical structure elements of the page using the determined object significance scores and the enclosing regions associated with the graphical objects; and
processing the plurality of commands according to the determined logical structure elements and a second presentation mode which is different from the first presentation mode.

* * * * *